(12) United States Patent
Cote et al.

(10) Patent No.: US 8,146,524 B1
(45) Date of Patent: Apr. 3, 2012

(54) SEATING ARRANGEMENT FOR A VEHICLE

(75) Inventors: Andre Cote, Longueuil (CA); Sam Spade, Palm Bay, FL (US); Lonnie Lieb, West Melbourne, FL (US); Richard Lefebvre, Shefford (CA); Rick Adamczyk, St-Cloud, FL (US)

(73) Assignee: Bombardier Recreational Products Inc., Valcourt (CA)

( * ) Notice: Subject to any disclaimer, the term of this patent is extended or adjusted under 35 U.S.C. 154(b) by 131 days.

(21) Appl. No.: 12/609,719

(22) Filed: Oct. 30, 2009

(51) Int. Cl.
*B63B 35/73* (2006.01)
(52) U.S. Cl. .................................................. 114/55.57
(58) Field of Classification Search ............... 114/55.57, 114/363
See application file for complete search history.

(56) References Cited

U.S. PATENT DOCUMENTS

| | | | |
|---|---|---|---|
| 4,457,524 A | 7/1984 | Yoshiware | |
| 4,796,901 A | 1/1989 | Furukawa | |
| 5,520,133 A * | 5/1996 | Wiegert | 114/125 |
| 6,176,546 B1 * | 1/2001 | Andrews | 297/195.1 |
| 6,968,917 B2 | 11/2005 | Rondeau et al. | |
| 2009/0114466 A1 * | 5/2009 | Nishijima et al. | 180/219 |

OTHER PUBLICATIONS

Kawasaki, Jet Ski Watercraft Catalogue, 2007, P/N 99969-2178E, Canada.
Ducati Superbike Model Catalogue 2009; Oct. 2008.

* cited by examiner

*Primary Examiner* — Stephen Avila
(74) *Attorney, Agent, or Firm* — Osler, Hoskin & Harcourt LLP

(57) ABSTRACT

A straddle seat has a top portion having a rear portion and a front portion. Two side portions extend downwardly from the top portion. The front portion extends upwardly and forwardly from the rear portion. The front portion is hourglass shaped and has a narrowing. The front portion has a pair of lateral wings extending laterally outwardly above at least part of the two side portions for covering at least in part knees and thighs of a driver. A personal watercraft having such a straddle seat is also described. The personal watercraft has a helm assembly and footrests having middle sections disposed rearwardly of the helm assembly. Front sections extend upwardly and forwardly from the middle sections forming a first angle. Rear sections extend upwardly and rearwardly from the middle sections forming a second angle. The first angle is greater than the second angle.

19 Claims, 24 Drawing Sheets

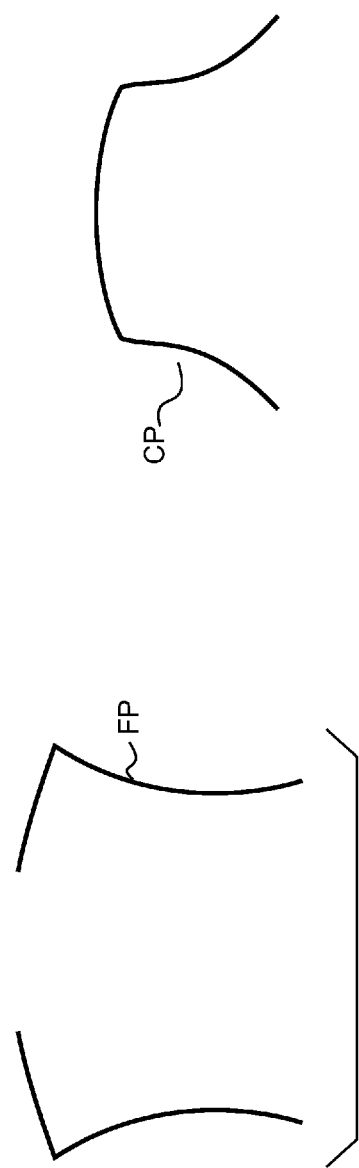
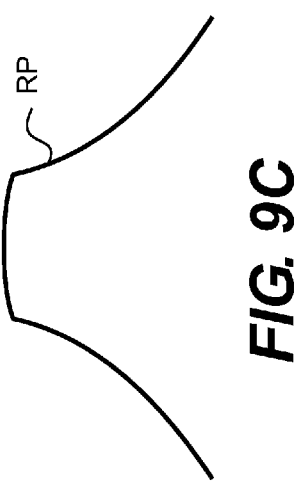
FIG. 9A
FIG. 9B
FIG. 9C

SEATING ARRANGEMENT FOR A VEHICLE

FIELD OF THE INVENTION

The present invention relates to straddle seats and seating arrangements for vehicles.

BACKGROUND OF THE INVENTION

When riding a personal watercraft, the driver typically straddles the seat and locates his/her feet on footrests on each side of the seat. To maneuver the watercraft, the driver steers the handlebar in the direction he/she wishes to go. The driver can additionally use his/her body weight to accompany the turning operation by leaning forward and/or laterally. To lean, the driver typically grips the seat with his/her legs and forces laterally on the handlebar.

In high speed buoy courses, leaning solicits greatly from the upper body of the driver. As a result of over stimulation of the upper body, the agility, the concentration and the driver's reaction time may become compromised.

In addition, leg room available to the driver for stabilizing his/her feet is limited due to the bottom of the footrests to reduce water accumulation. This in turn limits the operation of the watercraft since the driver can only arrange his/her feet in a limited number of positions.

In cases where the driver is actively pressing against a front of the seat, it is often contemplated that he/she find his/her knees abutting the helm assembly instead of the seat. Current seats are too short for allowing the driver to comfortably and reliably perform certain types of maneuvers such as sharp turn at high speeds.

Therefore, there is a need for an element or a combination of elements of a watercraft whose design would increase maneuverability and would reduce forces experienced by the upper body of a driver when steering the watercraft.

SUMMARY OF THE INVENTION

It is an object of the present invention to ameliorate at least some of the inconveniences present in the prior art.

It is also an object of the present invention to provide a seat of a watercraft that would help transfer of at least some forces experienced by the upper body of a driver toward the lower body of the driver.

It is another object of the present invention to provide a straddle seat for straddling-type vehicles (including personal watercraft) comprises a pair of lateral wings that serve as knee braces. The knee braces are designed to cover at least in part knees and thighs of the driver when the driver straddles the seat. The pair of lateral wings also allow the driver to instinctively find its knee and thighs position on the straddle seat in preparation for sharp turns. The pair of lateral wings partially restrain the entire body from sliding off the vehicle due to an upward translation.

In one aspect, the invention provides a straddle seat for a vehicle comprising a seat section having a top portion having a rear portion and a front portion. The front portion of the top portion extends upwardly and forwardly from the rear portion. The front portion of the top portion has a generally hourglass shape. The hourglass shape has a narrowing. The front portion of the top portion has a pair of lateral wings. Two side portions downwardly extend from the top portion. The pair of lateral wings extend laterally outwardly above at least part of the two side portions.

In a further aspect, the pair of lateral wings are adapted to cover at least in part knees and thighs of a rider.

In an additional aspect, the pair of lateral wings and the two side portions have front portions. The front portions of the two side portions are located underneath the front portions of the pair of lateral wings, the front portions of the two side portions being concave. The front portions of the pair of lateral wings extend laterally outwardly beyond the front portions of the two side portions.

In a further aspect, the two side portions have central portions. The central portions of the two side portions extend generally outwardly from the central section. The pair of lateral wings have rear portions. The central portions of the two side portions are located underneath the rear portions of the pair of lateral wings. The rear portions of the lateral wings extend partially laterally outwardly above the central portions of the two side portions.

In an additional aspect, the two side portions have rear portions. The rear portions of the two side portions are located rearwardly of the pair of lateral wings. The rear portions of the two side portions extend outwardly from the central section.

In a further aspect, the rear portion of the top portion extends generally upwardly and rearwardly from the front portion of the top portion.

In an additional aspect, the seat section is a front seat section. The straddle seat further comprises a rear seat section extending upwardly and rearwardly from the rear portion of the top portion of the front seat section.

In a further aspect, the front portion of the top section is generally planar.

In an additional aspect, the front portion has a top front portion profile. The top front portion profile is smooth. The rear portion has a top rear portion profile. The top rear portion profile is smooth. The top front portion profile is continuous with the top rear portion profile.

In a further aspect, a width between forwardmost points of the front portion of the top portion is larger than a width between forwardmost points of the two side portions.

In an additional aspect, a horizontal longitudinal distance between an outwardmost point of the front portion of the top portion and the narrowing is smaller than a horizontal longitudinal distance between a forwardmost point of the two side portions and the narrowing.

In another aspect, the invention provides a straddle seat for a vehicle comprising a top portion and two side portions extending downwardly from the top portion. The two side portions are disposed inwardly of the top portion at a front of the seat. The two side portions extend at least in part outwardly from the top portion at a position rearward of a front of the seat.

It is also an object of the present invention to provide a vehicle having the above straddle seat.

In one aspect the invention provides a vehicle comprising a steering assembly and a frame having an upper portion. a drive assembly is supported by the frame. A straddle seat is disposed on the upper portion of the frame and at least in part rearwardly of the steering assembly. The straddle seat has a seat section having a top portion having a rear portion and a front portion. The front portion extend upwardly and forwardly from the rear portion. The front portion has a generally hourglass shape. The hourglass shape has a narrowing. The seat section has two side portions downwardly extending from the top portion. The front portion of the top portion has a pair of lateral wings extending laterally outwardly above at least part of the two side portions for covering at least in part knees and thighs of a rider.

It is another object of the present invention to provide a watercraft having the above straddle seat and a pair of footrests for accommodating a driver's feet. To optimize force transfer toward the lower body of the driver and to increase maneuverability, footrests of the watercraft have been designed to include different sections for accommodating feet of the driver in different positions during different types of maneuvers. A front section of the footrests is preferably used when the driver sits in a cruising position. A central section of the footrests is preferably used when the driver stands up. A rear section of the footrests is preferably used when the driver stands and leans forward such as when racing.

In one aspect the invention provides a personal watercraft comprising a hull and a deck disposed above the hull. An engine is disposed at least in part in the hull. A propulsion system is connected to the hull and operatively connected to the engine. A helm assembly is disposed on the deck. A straddle seat is disposed on the deck at least in part rearwardly of the helm assembly. The straddle seat has a seat section having a top portion. The top portion has a rear portion and a front portion. The seat section has two side portions downwardly extending from the top portion. The front portion of the top portion extends upwardly and forwardly from the rear portion. The front portion has a generally hourglass shape. The hourglass shape has a narrowing. The front portion of the top portion has a pair of lateral wings extending laterally outwardly above at least part of the two side portions for covering at least in part knees and thighs of a rider. A footrest is disposed on each side of the straddle seat. Each footrest has a middle section disposed rearwardly of the helm assembly. A front section extends upwardly and forwardly from the middle section. The front section forms a first angle with the middle section. The front section extends at least in part forwardly of the helm assembly. A rear section extends upwardly and rearwardly from the middle section. The rear section is in communication with a rear of the deck. The rear section forms a second angle with the middle section. The first angle is greater than the second angle.

In a further aspect, the pair of lateral wings and the two side portions of the straddle seat have front portions. The front portions of the two side portions are located underneath the front portions of the pair of lateral wings. The front portions of the two side portions are concave.

In an additional aspect, the rear portion of the top portion of the straddle seat extends upwardly and rearwardly from the front portion of the top portion.

In a further aspect, the seat section is a front seat section. The straddle seat further comprises a rear seat section extending upwardly and rearwardly from the rear portion of the top portion of the front seat section. The rear seat section is adapted to seat at least one passenger.

In an additional aspect, the middle section of each footrest further comprises a pad covering an outward portion of the middle section, the pad extending outwardly and upwardly from the middle section.

In a further aspect, a pedestal is disposed on the deck at least in part rearwardly of the helm assembly. The pedestal supports the straddle seat. The rear section of each footrest extends upwardly and outwardly from the pedestal.

In an additional aspect, the first angle is about 37 degrees.

In a further aspect, the second angle is about 18 degrees.

For purposes of this application, terms related to spatial orientation such as forwardly, rearwardly, left, and right, are as they would normally be understood by a rider or a driver of the vehicle sitting thereon in a normal riding position.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 9A is a profile of an outer surface of the straddle seat of FIG. 4 taken along the line FP in FIGS. 7A, 7B and 8;

FIG. 9B is a profile of an outer surface of the straddle seat of FIG. 4 taken along the line CP in FIGS. 7A, 7B and 8;

FIG. 9C is a profile of an outer surface of the straddle seat of FIG. 4 taken along the line RP in FIGS. 7A, 7B and 8;

FIG. 19a is an illustration showing a left side elevation view of the 5th percentile female driver in a cruising position on the personal watercraft of FIG. 1;

DETAILED DESCRIPTION OF THE PREFERRED EMBODIMENTS

With reference to FIGS. 1 to 13, a personal watercraft (hereinafter called watercraft) 100 having a straddle seat 200 will be described. It should be understood that the straddle seat 200 is adaptable to be mounted on other types of straddle type vehicles such as snowmobiles, ATVs and motorbikes.

The watercraft 100 is designed to comfortably accommodate a range of drivers (or riders). Examples of different male and female drivers will be given below with respect to FIGS. 14 and 15.

Figure 1:
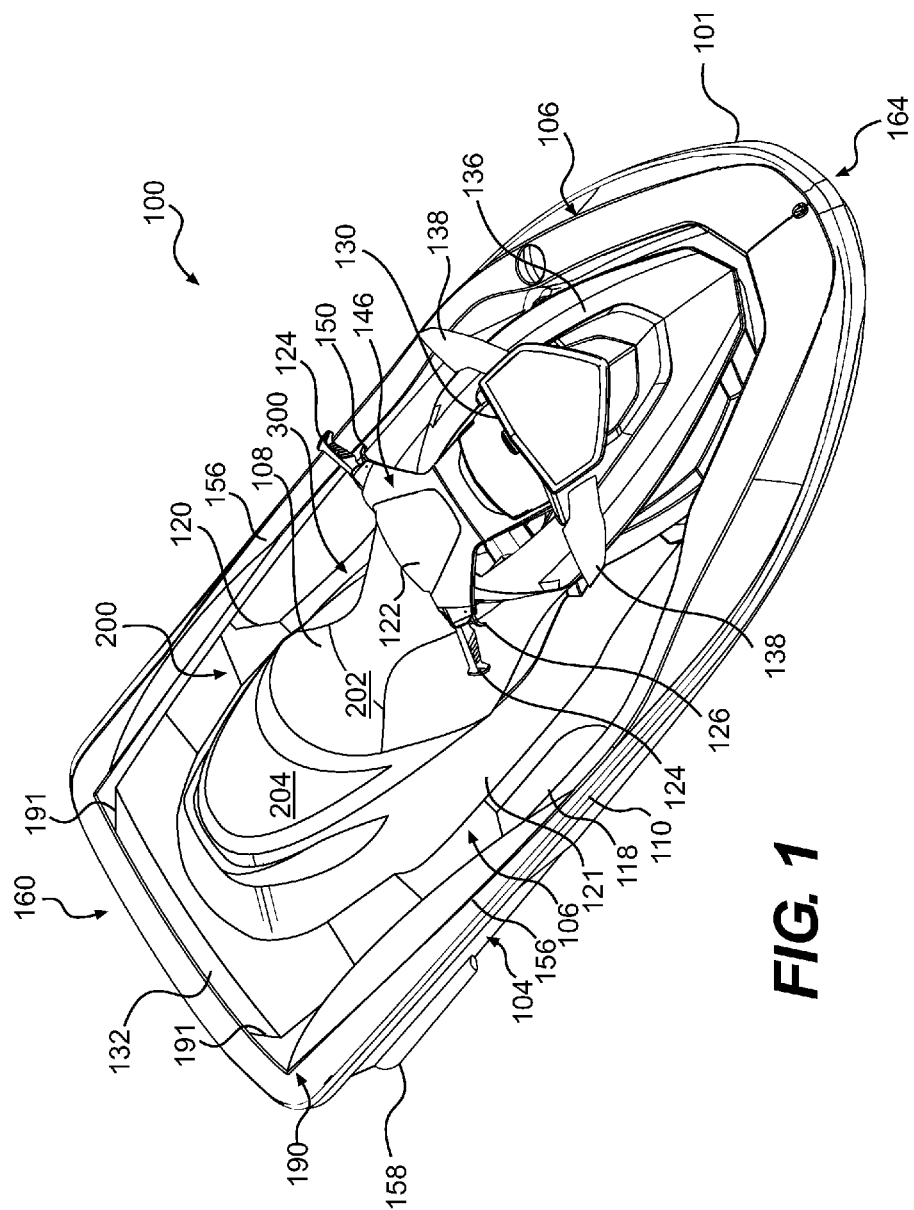
FIG. 1 is a perspective view, taken from a front, right side of a personal watercraft according to the present invention.
Figure 2:
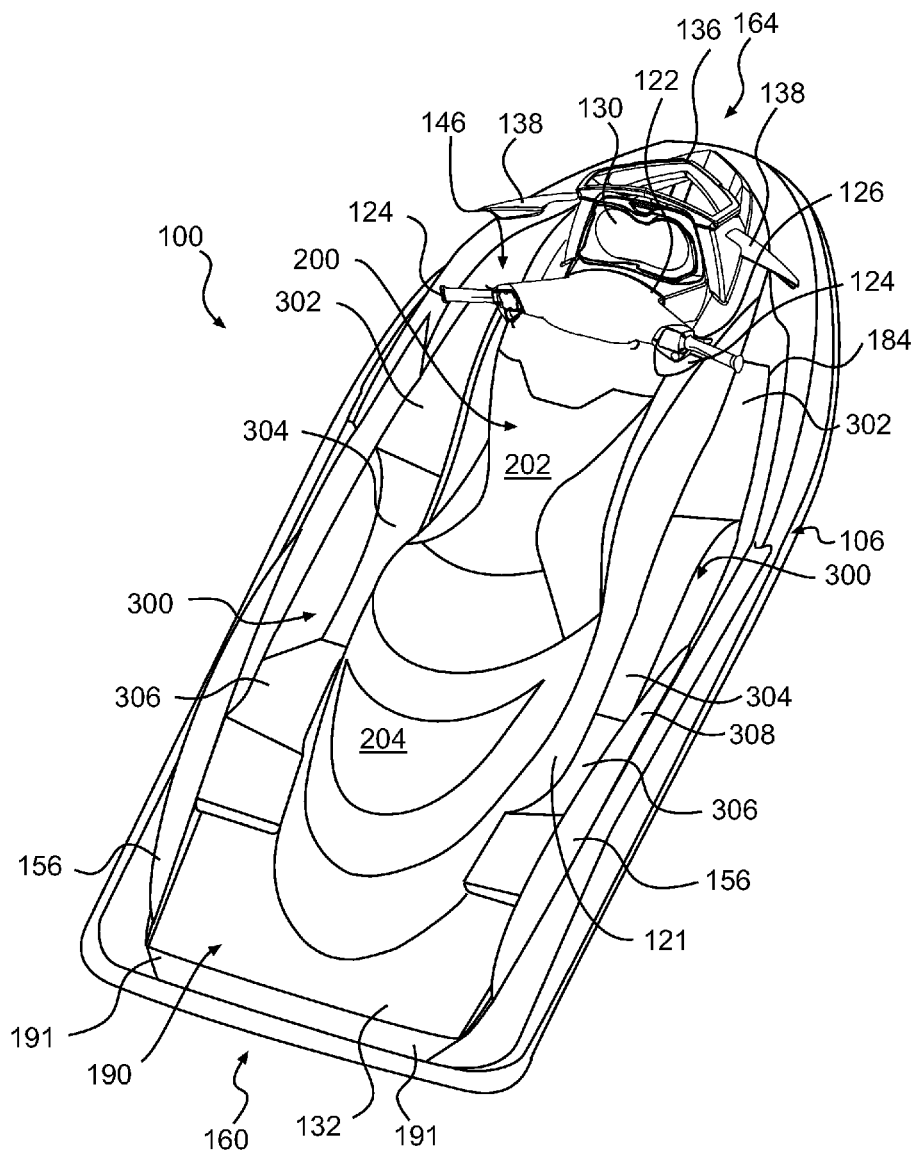
FIG. 2 is a perspective view taken from a rear, right side of the personal watercraft of FIG. 1.
Figure 3:
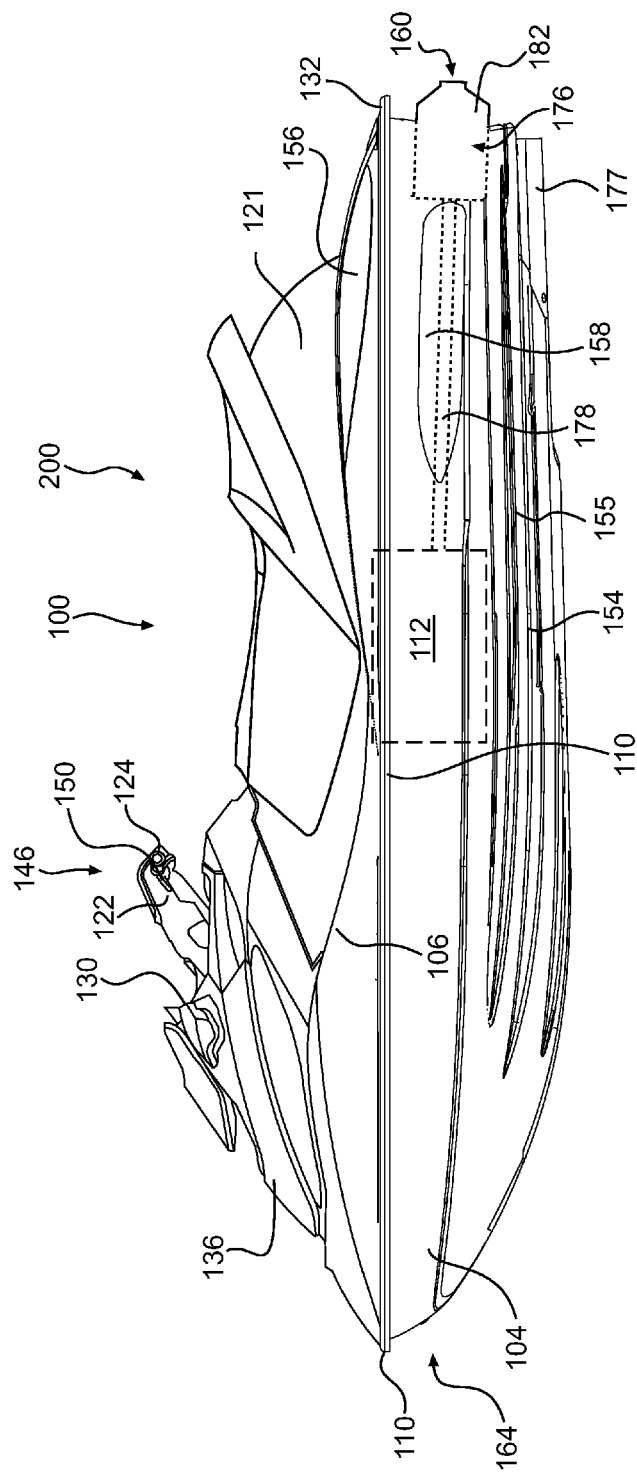
FIG. 3 is a left side elevation view of the personal watercraft of FIG. 1.
Figure 4:
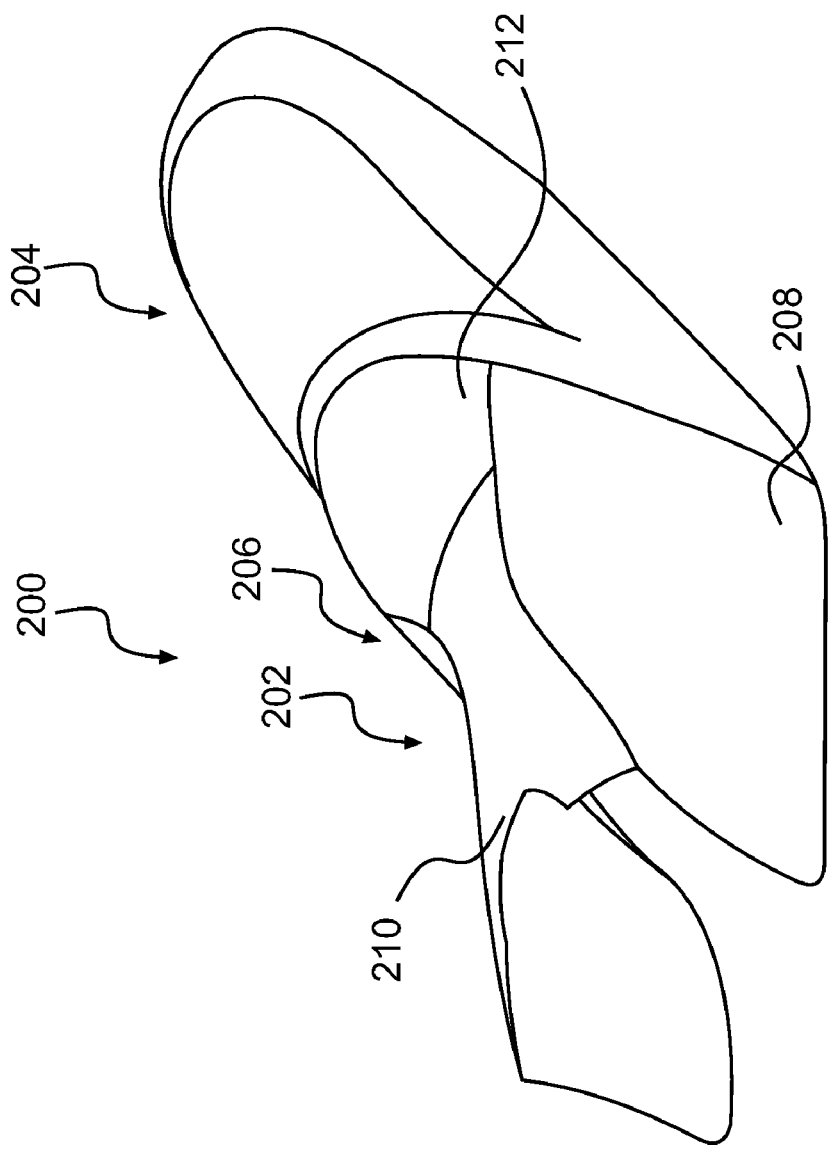
FIG. 4 is a perspective view taken from a front, left side of a straddle seat for the personal watercraft of FIG. 1.

FIGS. 1-3 illustrate a personal watercraft 100 in accordance with the present invention. The personal watercraft 100 is made of two main parts: a hull 104 and a deck 106 disposed on the hull 104. The hull 104 buoyantly supports the watercraft 100 in the water. The deck 106 is designed to accommodate a driver and, in some watercraft, one or more passengers. The hull 104 and deck 106 are joined together at a bond line 110 by an adhesive. Rivets or other fasteners may also be used to join the hull 104 to the deck 106. A bumper 101 generally covers the bond line 110, which helps to prevent damage to an outer surface of the watercraft 100 when the watercraft 100 is docked. The volume created between the hull 104 and the deck 106 is known as the engine compartment. The engine compartment accommodates the engine 112 (schematically illustrated in FIG. 3) as well as other elements required by or desired for the watercraft 100.

The deck 106 has a straddle seat 200 centrally positioned on top of a pedestal 121 to accommodate the driver in a straddling position. The straddle seat 200 is preferably removably attached to the pedestal 121 by a hook and tongue assembly (not shown) at a front of the straddle seat 200 and by a latch assembly (not shown) at the rear of the straddle seat 200. It is contemplated that the straddle seat 200 could be attached to the pedestal 121 by other attachment mechanisms. The straddle seat 200 covers an engine access opening (not shown), defined by a top portion of the pedestal 121, which provides access to the engine 112. A grab handle could be provided between the pedestal 121 and the straddle-type seat 200 at a rear of the straddle seat 200 to provide a handle onto which a passenger may hold on. The straddle seat 200 has additional features that will be described in greater details below.

The watercraft 100 has a pair of generally upwardly extending walls, known as gunwales or gunnels 156, located on either side of the watercraft 100. The gunnels 156 help to discourage the entry of water in the watercraft 100, provide lateral support for the driver's feet, and also provide buoyancy when turning the watercraft 100, since personal watercraft roll slightly when turning. Optionally, the gunnels 156 could extend inwardly to act as heel rests towards a rear 190 of the watercraft 100. Heel rests 191 allow a passenger riding the watercraft 100 facing the towards the rear, to spot a waterskier for example, to place his/her heels on the heel rests, thereby providing him with a more stable riding position. It should be noted that heel rests could also be separate from the gunnels 156.

Located on either side of the straddle seat 200, between the pedestal 121 and the gunnels 156, are a pair of footrests 300.

The footrests 300 are designed to accommodate the driver's feet in various riding positions. To this effect, the footrests 300 have various portions which will be described in greater detail below. The footrests 300 may be covered by carpeting made of a rubber-type material to provide additional comfort and feet traction for the rider.

A reboarding platform 132 is provided at the rear 190 of the watercraft 100 to allow the rider or a passenger to easily reboard the watercraft 100 from the water. Carpeting may also cover the reboarding platform 132. A retractable ladder may be affixed to the transom 160 to facilitate boarding the watercraft 100 from the water onto the reboarding platform 132.

A helm assembly 146 is positioned forwardly of the straddle seat 200. The helm assembly 146 has a central helm portion 122 that may be padded, and a pair of steering handles 124. The right steering handle 124 is provided with a throttle lever 126 allowing the rider to control the speed of the watercraft 100, and the left steering handle 124 with a lever 150 to control a position of a reverse gate (as described below). The central helm portion 122 may also have buttons that allow the rider to modify what is displayed (speed, engine rpm, time . . . ) on a display cluster 130 located forwardly of the helm assembly 146 or to change a condition of the watercraft 100. The helm assembly 146 may also be provided with a key receiving post, preferably located near a center of the central helm portion 122. The key receiving post is adapted to receive a key attached to a lanyard so as to allow starting of the watercraft 100. It should be noted that the key receiving post may be placed in any other suitable location on the watercraft 100.

The watercraft 100 is provided with a hood 136 located forwardly of the helm assembly 146. A hinge (not shown) is attached between a forward portion of the hood 136 and the deck 106 to allow hood 136 to move between an open position providing access to a storage bin (not shown) and a closed position preventing access to the storage bin, as will be discussed in greater detail below. A latch (not shown) located at a rearward portion of hood 136 locks the hood 136 into a closed position.

As best seen in FIG. 3, the hull 104 is provided with a combination of strakes 154 and chines 155. A strake 154 is a protruding portion of the hull 104. A chine 155 is the vertex formed where two surfaces of the hull 104 meet. It is this combination of strakes 154 and chines 155 that will give the watercraft 100 its riding and handling characteristics.

Sponsons 158 are located on either of the hull 104 near the transom 160. The sponsons 158 have an arcuate undersurface, which give the watercraft 100 both lift while in motion and improved turning characteristics.

A hook (not shown) is located at the bow 164 of the watercraft 100. The hook is used to attach the watercraft 100 to a dock when it is not in use.

The watercraft 100 is propelled by a jet pump 176. It is contemplated that other types of propulsion systems, such as propellers, could also be used. The jet pump 176 pressurizes water and accelerates it to create thrust. The water is first scooped from under the hull 104 through an inlet grate (not shown). The inlet grate prevents large rocks, weeds, and other debris from entering the jet pump 176 since they may damage it or negatively affect its performance. Water then flows through the water intake ramp (not shown). The top portion of the water intake ramp is preferably formed by hull 104 and the ride shoe (not shown) forms its bottom portion. Alternatively, the intake ramp may be a single piece to which the jet pump 176 attaches. In such cases, the intake ramp and the jet pump unit 176 are attached as a unit in a recess in the bottom of hull 104. From the intake ramp, water then enters the jet pump 176. The jet pump 176 is located in what is known as the tunnel (not shown). The tunnel is opened towards the rear, and is defined at the front, sides, and top by the hull 104, and at the bottom by the ride plate 177. The ride plate 177 is the surface on which the watercraft 100 rides or planes. The jet pump 176 is made of two main parts: the impeller (not shown) and the stator (not shown). The impeller is coupled to the engine 112 by one or more shafts 178, such as a driveshaft and an impeller shaft. The rotation of the impeller pressurizes the water, which then moves over the stator that is made of a plurality of fixed stator blades (not shown). The role of the stator blades is to decrease the rotational motion of the water so that most of the energy imparted to the water is used for thrust, as opposed to swirling the water. Once the water leaves the jet pump 176, it goes through the pump nozzle (not shown). Since the pump nozzle's exit diameter is smaller than its entrance diameter, the water is accelerated further, thereby providing more thrust. A steering nozzle 182 is pivotally attached to the pump nozzle through a vertical pivot point. The steering nozzle 182 is operatively connected to the helm assembly 146 via a push-pull cable (not shown) such that when the helm assembly 146 is turned, the steering nozzle 182 pivots, redirecting the water coming from the pump nozzle, so as to steer the watercraft 100 in the desired direction. In some watercraft, the steering nozzle 182 may be gimbaled to allow it to move around a second horizontal pivot axis. The up and down movement of the steering nozzle 182 provided by this additional pivot axis is known as trim, and controls the pitch of the watercraft 100.

When the watercraft 100 is in movement, its speed is measured by a speed sensor (not shown) attached to the transom 160 of the watercraft 100. The speed sensor has a paddle wheel which is turned by the flow of water passing by the watercraft, therefore the faster the watercraft 100 goes, the faster the paddle wheel turns. An electronic control unit (not shown) connected to the speed sensor converts the rotational speed of the paddle wheel to the speed of the watercraft 100 in kilometers or miles per hour, depending on the rider's preference. The speed sensor may also be placed in the ride plate 177 or any other suitable position. Other types of speed sensors, such as pitot tubes, could also be used.

Some watercraft 100 have the ability to move in a reverse direction by using a reverse gate (not shown). The reverse gate is pivotally attached to the sidewalls of the tunnel, directly on the pump nozzle, or directly on the steering nozzle 182. To make the watercraft 100 move in a reverse direction, the rider pulls on a reverse handle (not shown) operatively connected to the reverse gate. The reverse gate then pivots in front of the steering nozzle 182 and redirects the water leaving the jet pump 176 towards the front of the watercraft 100, thereby thrusting the watercraft 100 rearwardly.

Referring now in particular to FIGS. 4 to 11B, the straddle seat 200 will be described in greater details.

The straddle seat 200 has a front seat section 202 located at least in part rearwardly of the helm assembly 146 to accommodate the driver, and a rear seat section 204 extending rearwardly and upwardly from the front seat section 202 to accommodate one passenger. It is contemplated that the rear seat section 204 could be sized to accommodate more than one passenger, or that the rear seat section 204 be omitted. The front section 202 and the rear section 204 are fixedly connected together, and are mounted onto and removed from the pedestal 121 together such as described above.

The front seat section 202 comprises a top portion 206 and two side portions 208 extending downwardly from the top portion 206. The top portion 206 has a front portion 210 and a rear portion 212. The front portion 210 and the rear portion 212 form a continuous profile of an upper surface of the top portion 206. The front portion 206 is generally planar and extends generally upwardly and forwardly. A rear part of the front portion 206 extends slightly rearwardly and upwardly from a front part of the front portion 206. It is contemplated that the rear part of the front portion 206 could extend more significantly rearwardly and upwardly from the front part of the front portion 206. The front portion 210 is hourglass shaped and comprises a narrowing 214. The narrowing 214 is located at about the mid-length of the top portion 206. It is contemplated that the narrowing 214 could be located elsewhere in the top portion 206.

Figure 5:
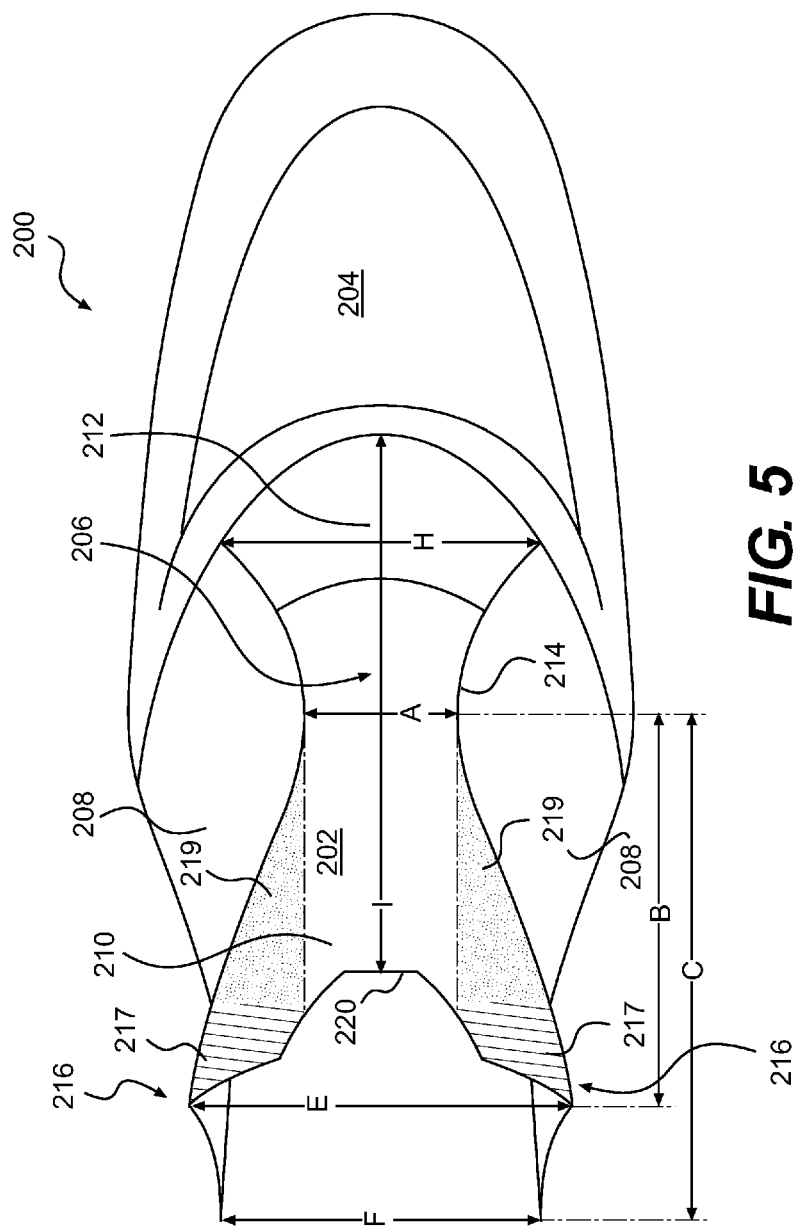
FIG. 5 is a top plan view of the straddle seat of FIG. 4 with different parts of a top portion of the straddle seat of FIG. 4 having different shading types.

The front portion 210 of the top portion 206 comprises a pair of lateral wings 216 at a front of the straddle seat 200 extending at least partially above the two side portions 208. The pair of lateral wings 216 comprises front wing portions 217 extending above and laterally outwardly beyond the two side portions 208. The front wing portions 217 correspond to a part of the lateral wings 216 located above the front side portions 208a. The rear wing portions 219 extend laterally outwardly above a portion of the two side portions 208 (as best seen in FIG. 5 with shadings illustrating the front and rear wing portions 217 and 219). The rear wing portions 219 correspond to a part of the lateral wings 216 located above the central side portions 208b. The front wing portions 217 generally cover portions of knees and at least in part thighs of the driver when the driver straddles the straddle seat 200, while the rear wing portions 219 generally cover a smaller portion of the thighs of the driver than the front wing portions 217. The driver typically uses the pair of lateral wings 216 as knee braces to transfer forces toward its lower body. The pair of lateral wings 216 also allows the driver to instinctively find its knee and thighs position on the straddle seat 200 in preparation for sharp turns (such as seen on drivers 50a, 50b and 50c in FIGS. 16A to 24C). Finally, the pair of lateral wings 216 also partially restrains the entire body from sliding off the watercraft 100 via an upward translation during operating conditions of high lateral forces as in buoy course. Use of the lateral wings 216 by the driver will be described in details below.

Figure 7A:
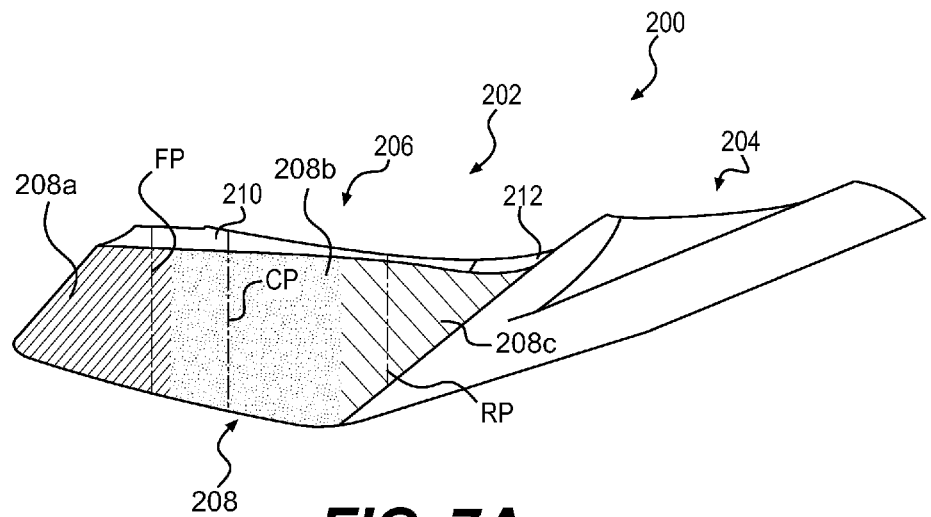
FIG. 7A is a left side elevation view of the straddle seat of FIG. 4 with different parts of side portions of the straddle seat of FIG. 4 having different shading types.
Figure 7B:
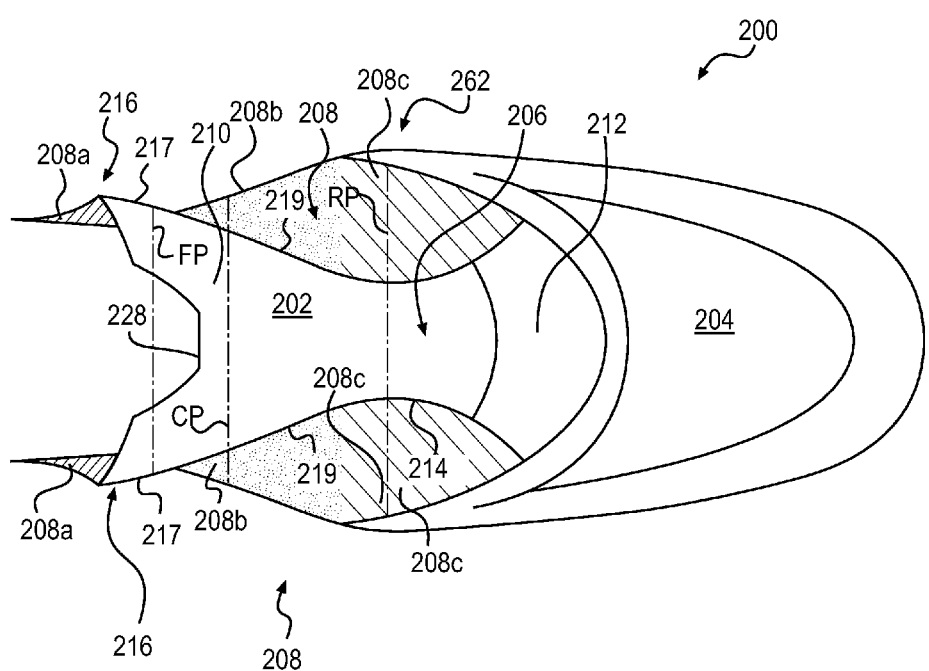
FIG. 7B is a top plan view of the straddle seat of FIG. 4 with different parts of side portions of the straddle seat of FIG. 4 having different shading types.
Figure 8:
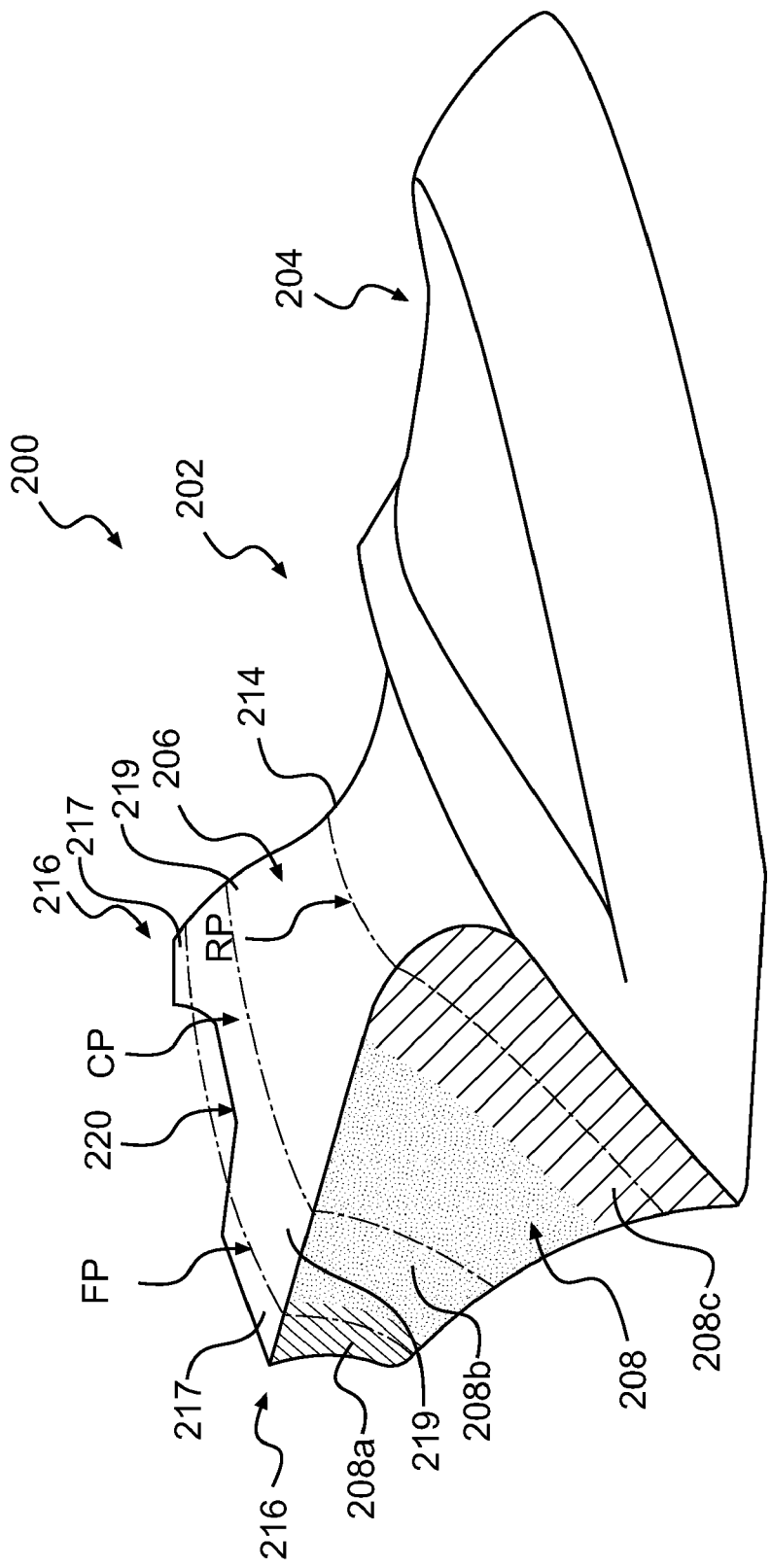
FIG. 8 is a perspective view taken from a rear, left side of the straddle seat of FIG. 4 showing lines FP, CP and RP.
Figure 10:
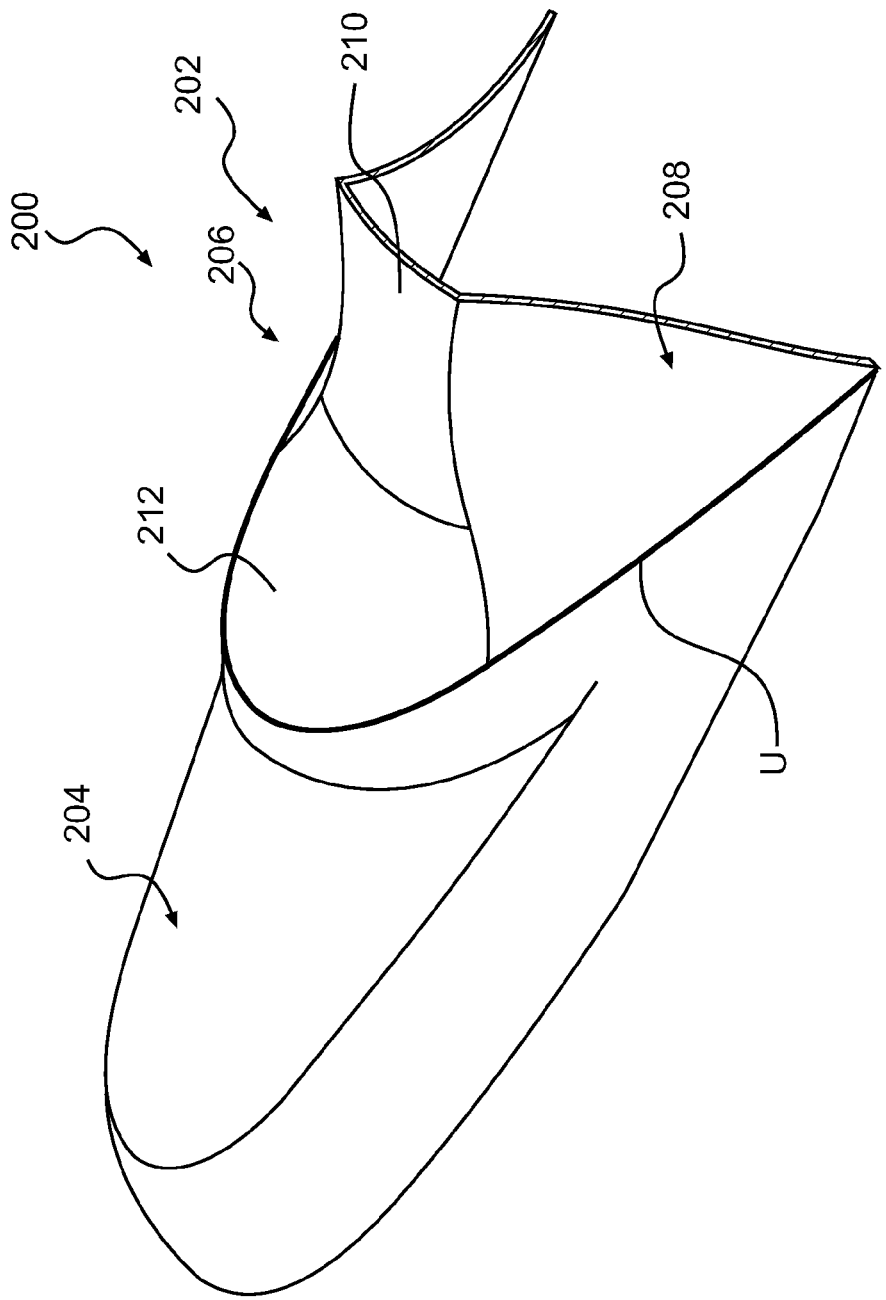
FIG. 10 is a perspective cross-sectional view taken from a front, right side of the straddle seat of FIG. 4 showing a U-shaped profile in bold.

The two side portions 208 extend outwardly from the top portion 206. Each of the two side portions 208 comprises a front side portion 208a underneath the front wing portion 217, a central side portion 208b underneath the rear wing portion 219, and a rear side portion 208c located rearwardly of the rear wing portion 219. FIGS. 7A and 7B show the portions 208a, 208b and 208c with different shading types. Shading types are used herein for illustrating different sections or portions and not for illustrating change of material. As it will be described below, the driver locates his/her knees and of thighs in the lateral portions 208a, 208b, 208c depending on the maneuver he/she wishes to accomplish. The side portions 208a, 208b and 208c have different outer surface profiles. As seen in FIG. 9A, an outer surface of the front side portion 208a has a generally concave profile FP. As seen in FIG. 9B, an outer surface of the central side portion 208b has a profile CP that is extending generally outwardly from the top portion 206. As seen in FIG. 9C, an outer surface of the rear side portion 208c has a profile RP that is extending generally outwardly from the top portion 206. The profile CP is more concave than the profile RP so as to transition between the concave profile FP and the profile RP. The concave shape of the front side portion 208a creates a depression in which the driver can abut his/her knees and locate them under the lateral wings 216 when straddling the straddle seat 200.

A recess 220 is located in the front portion 210 of the top portion 206 between the pair of lateral wings 216. The recess 220 is sized to accommodate the helm assembly 146.

The rear portion 212 of the front seat section 202 extends upwardly and rearwardly from the front portion 210. As it will be described in greater details below, the rear portion 212 is adapted to receive buttocks of the driver. The rear portion 212 has an outer edge forming a line U having a generally U-shape (shown in FIG. 10). The U-shape extends to bound with the two side portions 208. The U-shape creates an enlarged thigh gripping area, which improves comfort and maneuverability.

Figure 11A:
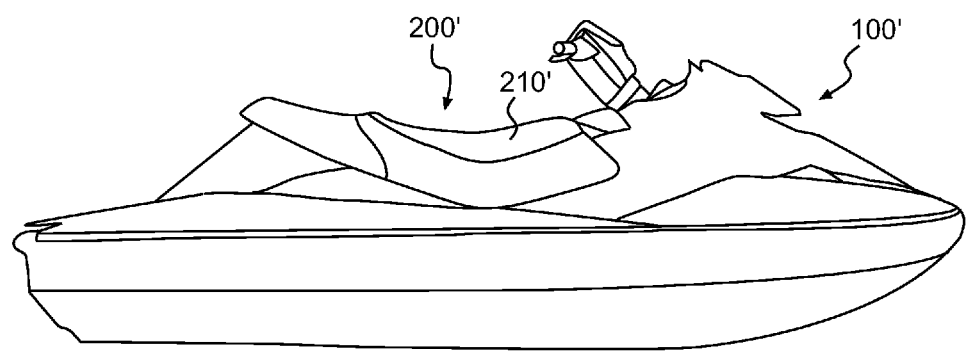
FIG. 11A is a right side elevation view of a prior art personal watercraft.

The rear seat section 204 is adapted to seat the passenger. The rear seat section 204 extends upwardly and rearwardly from the front seat section 202. The rear seat section 204 is similar to passenger seats of the prior art (as seen in FIG. 11A). It is contemplated that the rear seat section 204 could differ from the prior art and comprise lateral wings similarly to the front seat section 202.

The straddle seat 200 is made entirely of a flexible and resilient material having a surface hardness of IFD of 900 N. The term 'IFD' relates to Indentation Force Deflection (IFD) which is defined by ANSI/ASTM D3574-77 standard method of testing flexible cellular materials. The straddle seat 200 is more flexible than regular touring seats which have a surface hardness generally around 1200N. It is contemplated that the straddle seat 200 could be of another hardness, preferably between 750 N and 1050 N. It is also contemplated that the straddle seat 200 could be made of different types of materials, preferably providing a flexible surface.

Figure 6:
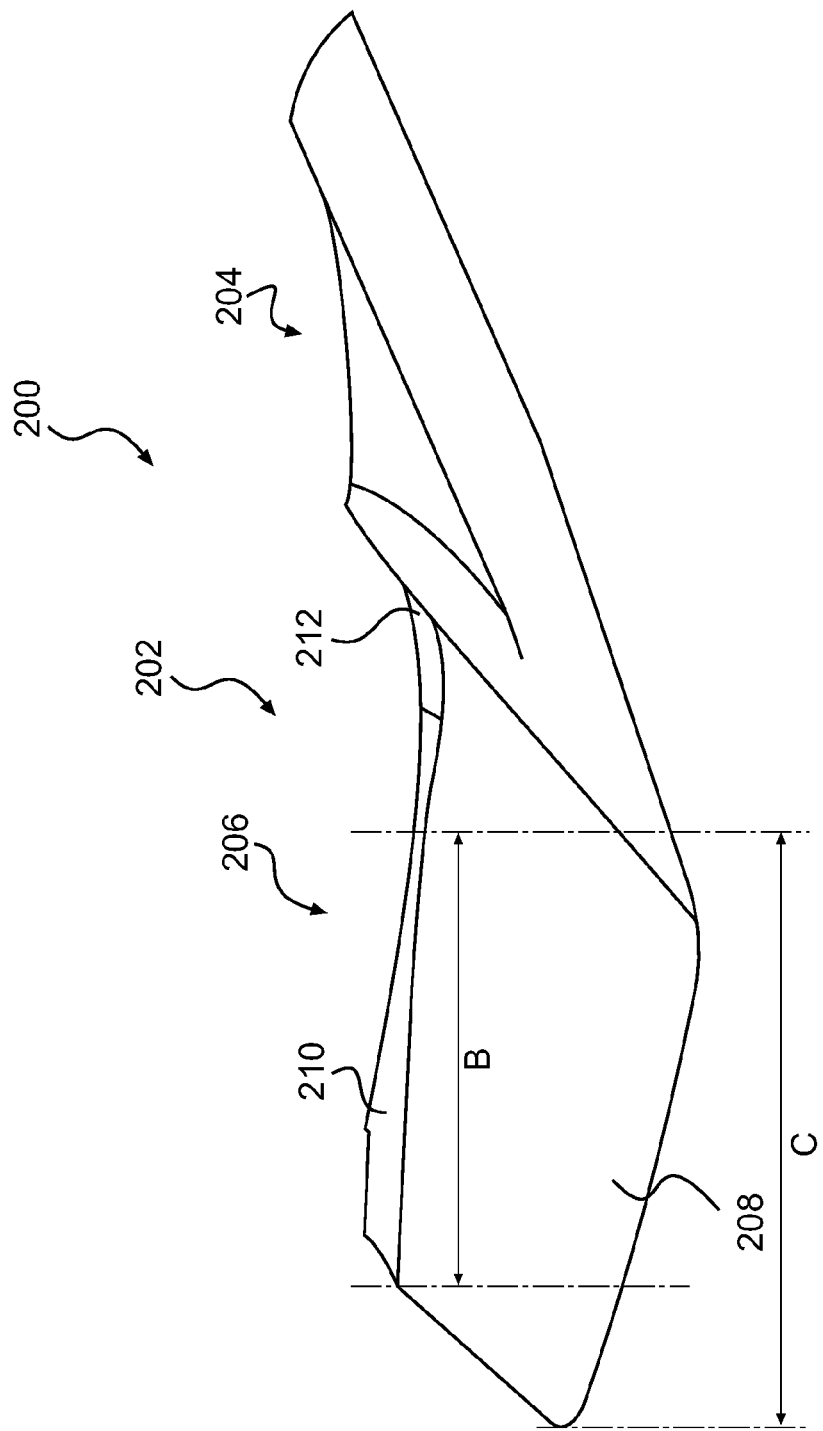
FIG. 6 is a left side elevation view of the straddle seat of FIG. 4.

Referring now to FIGS. 5 and 6, measurements of the straddle seat 200 will be given. The straddle seat 200 has a narrowing 214 of a width A that is about 156 mm, and preferably less than 180 mm. A horizontal longitudinal distance B between the narrowing 214 and a most outward point of the pair of lateral wings 216 is about 509 mm, and preferably greater than 400 mm. A horizontal longitudinal distance C between the narrowing 214 and a forwardmost point of the pair of lateral wings 216 is about 630 mm, and preferably greater than 530 mm. A width E between most outward points of each wing of the pair of lateral wings 216 is about 404 mm, and preferably smaller than 375 mm. A width F between forwardmost points of the two side portions 208 is about 335 mm, and preferably greater than 300 mm. A width H between most outwards points of the rear portion 212 is about 331 mm, and preferably between 290 and 370 mm. A horizontal longitudinal distance I between a most rearward point of the recess 220 and a most rearward point of the rear portion 212 is about 564 mm, and preferably between 500 and 700 mm.

Figure 11B:
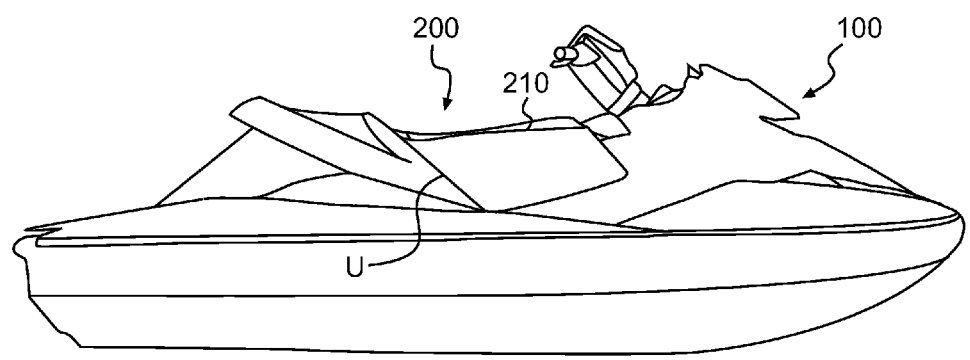
FIG. 11B is a right side elevation view of a personal watercraft according to the present invention.

With reference to FIGS. 11A and 11B, a watercraft 100' having a prior art straddle seat 200' is compared to the watercraft 100 having the straddle seat 200. A first distinctive feature between the straddle seat 200' and the straddle seat 200 is that the straddle seat 200' has a rear part of a front portion 210' extending rearwardly and upwardly from a front part of the front portion 210' more noticeably than the front portion 210 does, thus creating an inflexion point at the location of buttocks of the driver when he/she seats on the straddle seat 200'. A second distinctive feature between the straddle seat 200 and the straddle seat 200' is that the narrowing 214 of the straddle seat 200 is not present in the straddle seat 200'. The narrowing 214 allows the driver to have an enlarged contact area at its thighs and in turn to better grip the straddle seat 200. This enlarged contact area also allows greater weight transfer toward a lower body of the driver. In combination with the narrowing 214 of the top portion 206, central side portions 208b of the two side portions 208 allow greater leg room and in turn greater flexibility of maneuver. A third distinctive feature between the straddle seat 200 and the straddle seat 200' is the presence of the U-shaped line U in the straddle seat 200. As discussed earlier, the U-shaped top profile creates an enlarged thigh gripping area which in turn increases maneuverability.

Figure 12:
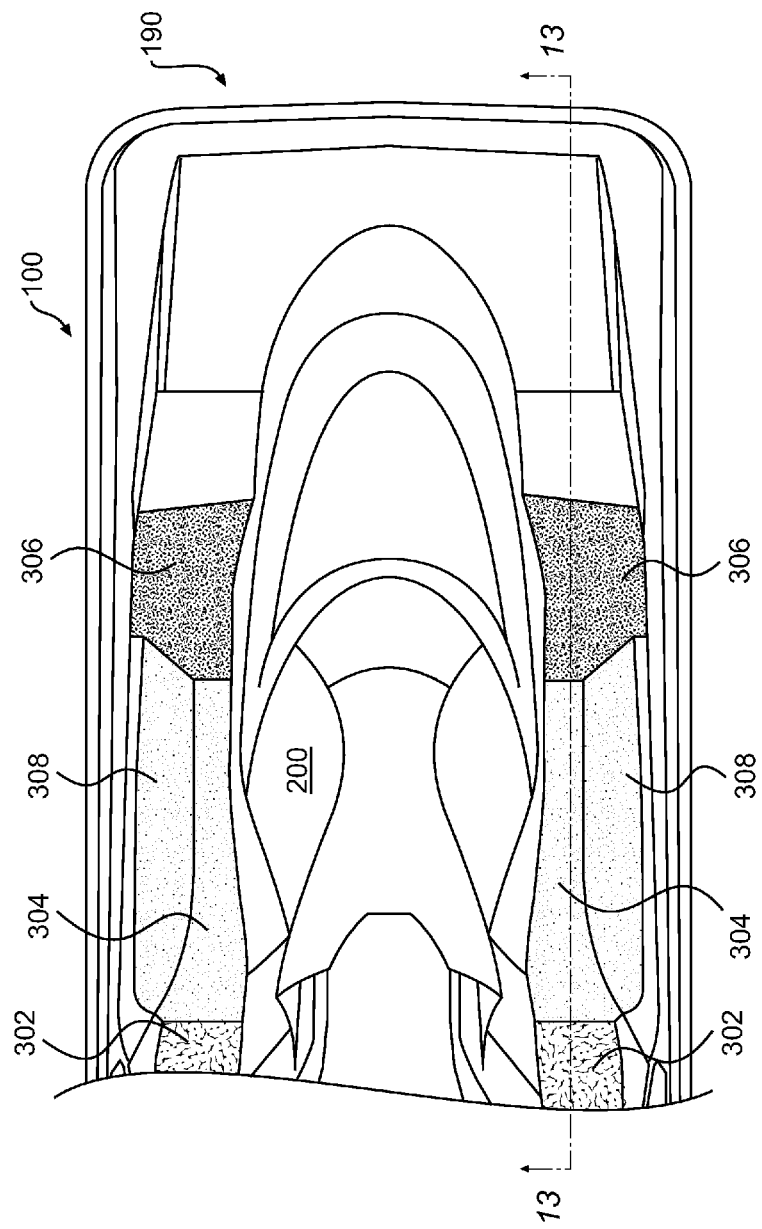
FIG. 12 is a top plan view of a rear portion of the personal watercraft of FIG. 1 with the handlebar removed for clarity and showing footrests of the watercraft, wherein different parts of the footrests have different shading types.
Figure 13:
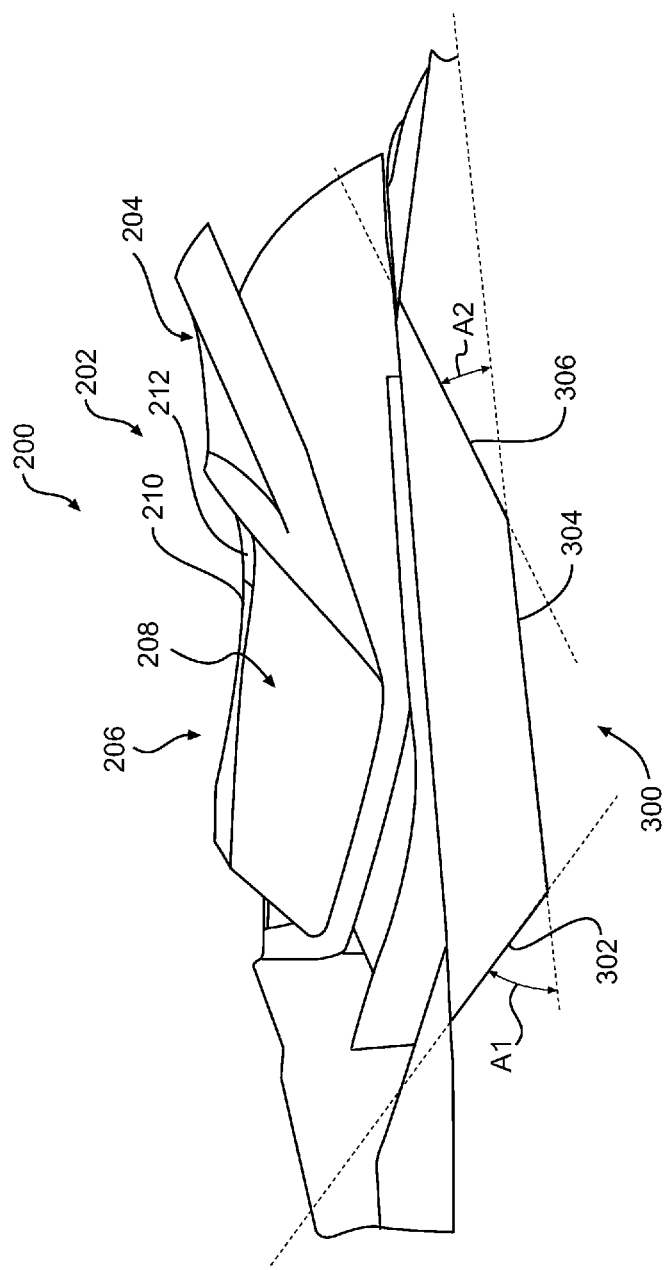
FIG. 13 is a partial cross-sectional view of the personal watercraft of FIG. 1 taken along line 13-13 of FIG. 12.

Turning now to FIGS. 12 and 13, the pair of footrests 300 for the watercraft 100 will now be described in greater details. The pair of footrests 300 is designed to provide support to the feet of the driver for different body positions as typically experienced by a driver in different driving conditions. The pair of footrests 300 is used to assist weight transfer towards the lower body of the driver, and to provide support and stability to the driver. It is contemplated that the watercraft 100 could comprise the straddle seat 200 and not the pair of footrests 300, but a pair of footrests of the prior art.

Each footrest 300 comprises a front section 302 extending at least partially forward of the helm assembly 146, a middle section 304 and a rear section 306 in communication with the rear 190 of the deck 106. Each section 302, 304, 306 is illustrated throughout the figures with a different shading type. Shading types are used herein for illustrating different sections or portions and not for illustrating change of material. The front section 302 extends upwardly and forwardly from the middle section 304. The rear section 306 extends upwardly and rearwardly from the middle section 304, and extends upwardly and outwardly from the pedestal 121. The middle section 304 comprises a pad 308 which covers an outward portion of the middle section 304. The pad 308 extends outwardly and upwardly from the middle section 304.

The front section 302 forms an angle A1 of about 37 degrees with the middle section 304. The angle A1 is preferably between 32 and 42 degrees. The rear section 306 forms an angle A2 of about 18 degrees with the middle section 304. The angle A2 is preferably between 9 and 24 degrees. The pad 308 forms an outward angle A3 (not shown) of about 18 degrees with respect to a lateral horizontal line (not shown). The angle A3 is preferably between 10 and 20 degrees. The rear section 306 forms an outward angle A4 (not shown) with a lateral horizontal line. The angle A4 is preferably between 5 and 15 degrees. The angles A3 and A4 are measured when the watercraft 100 is leveled about its roll axis.

Figure 14:
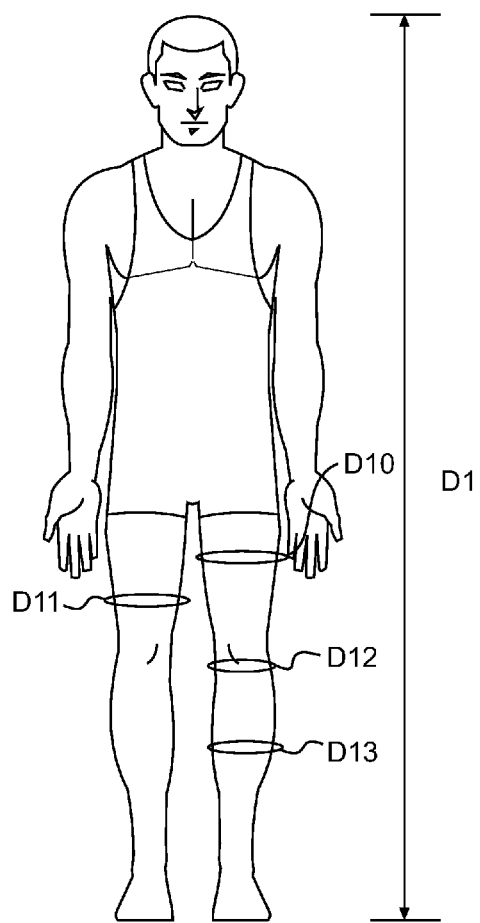
FIG. 14 is an illustration of a driver in a standing position.
Figure 15:
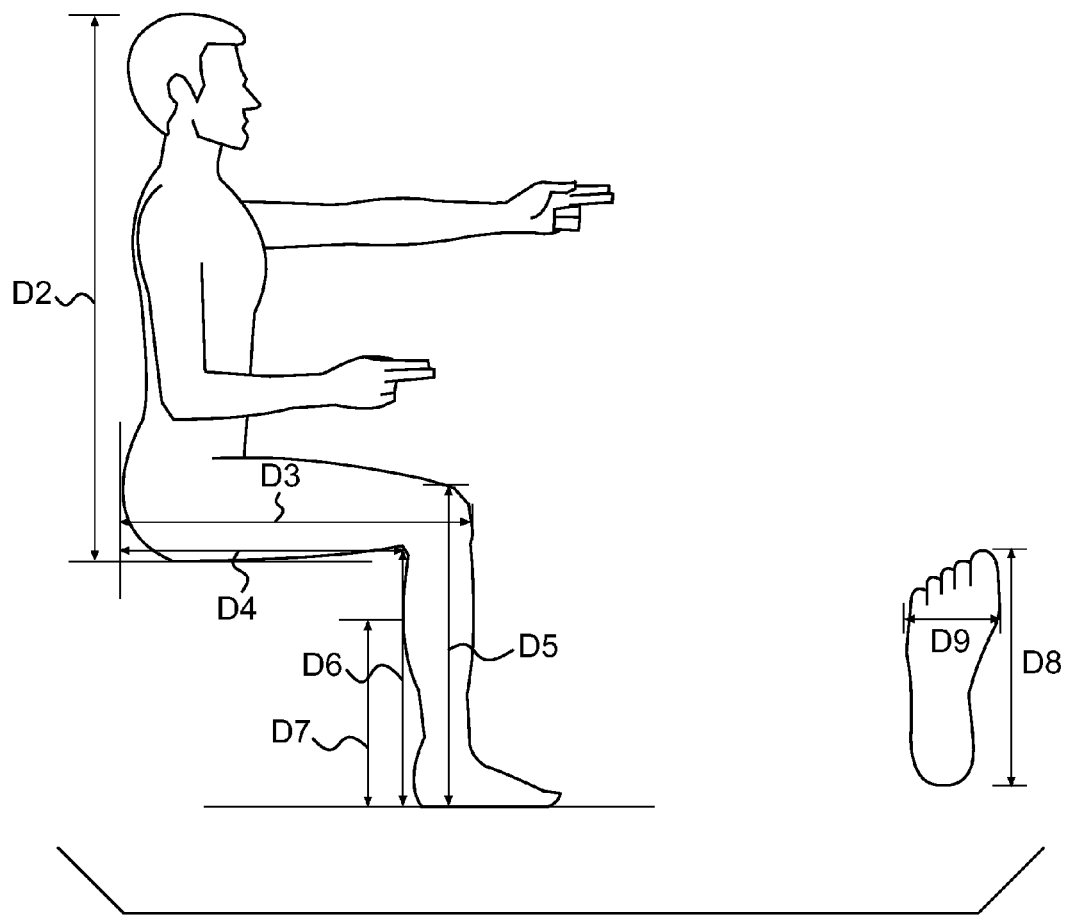
FIG. 15 is an illustration of a driver in a sitting position.
Figure 16A:
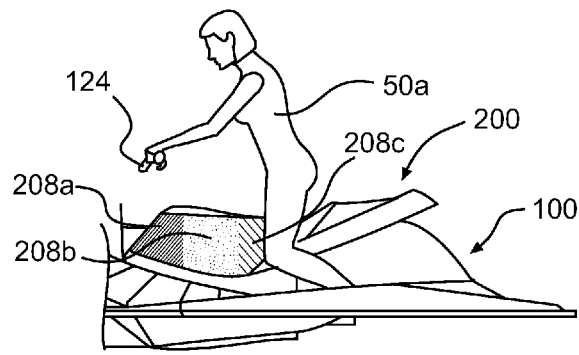
FIG. 16a is an illustration showing a left side view of a 5th percentile female driver in a stand-up position on the personal watercraft of FIG. 1.
Figure 16B:
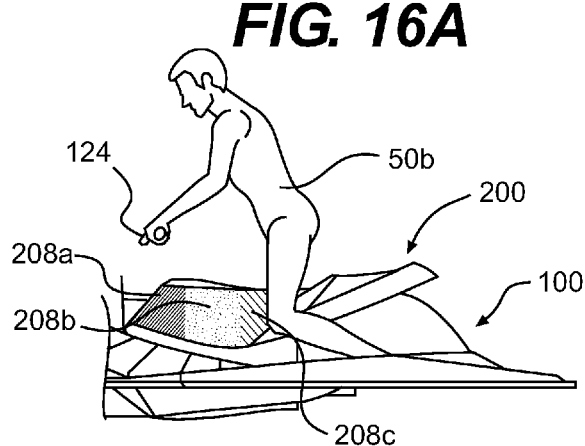
FIG. 16b is an illustration showing a left side view of a 50th percentile male driver in a stand-up position on the personal watercraft of FIG. 1.
Figure 16C:
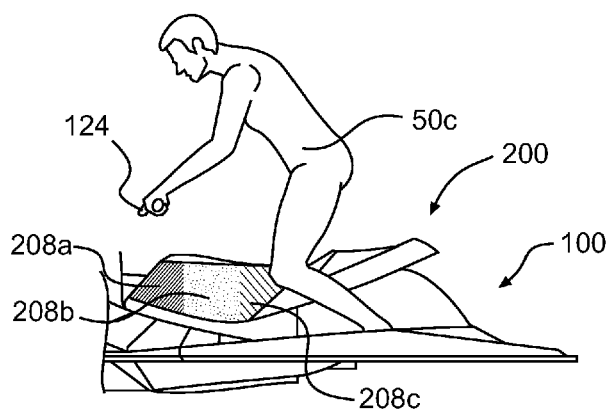
FIG. 16c is an illustration showing a left side view of a 95th percentile male driver in a stand-up position on the personal watercraft of FIG. 1.
Figure 17A:
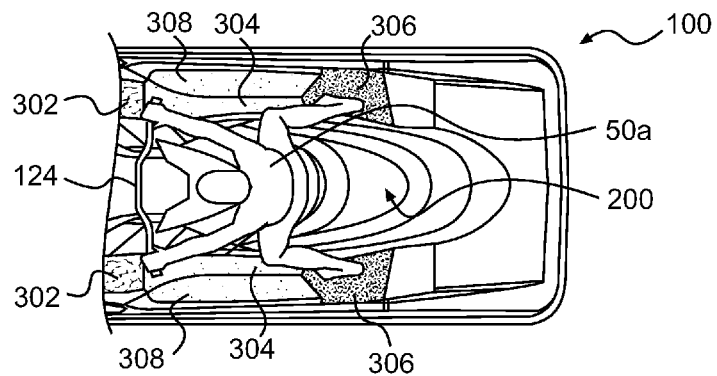
FIG. 17a is an illustration showing a top view of the 5th percentile female driver in a stand-up position on the personal watercraft of FIG. 1.
Figure 17B:
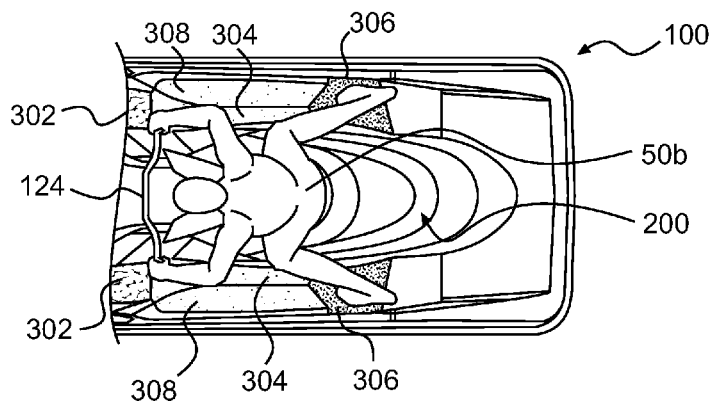
FIG. 17b is an illustration showing a top view of the 50th percentile male driver in a stand-up position on the personal watercraft of FIG. 1.
Figure 17C:
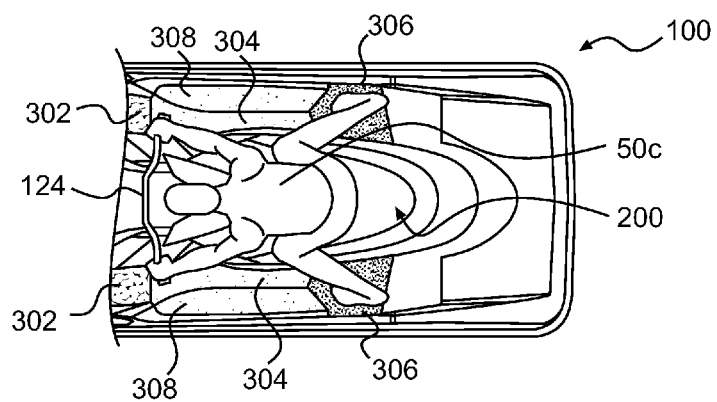
FIG. 17c is an illustration showing a top view of the 95th percentile male driver in a stand-up position on the personal watercraft of FIG. 1.
Figure 18A:
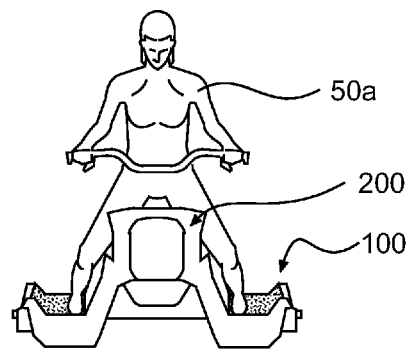
FIG. 18a is an illustration showing a front view of the 5th percentile female driver in a stand-up position on the personal watercraft of FIG. 1.
Figure 18B:
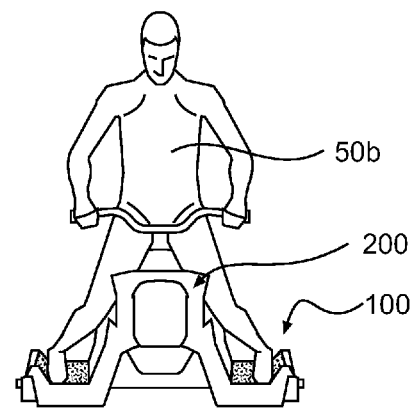
FIG. 18b is an illustration showing a front view of the 50th percentile male driver in a stand-up position on the personal watercraft of FIG. 1.
Figure 18C:
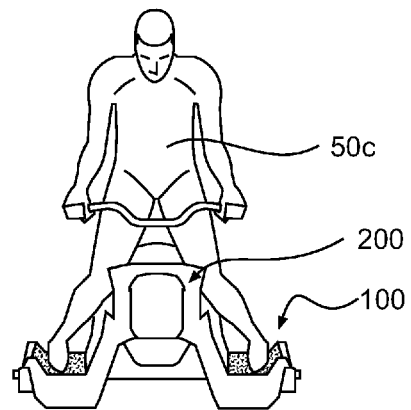
FIG. 18c is an illustration showing a front view of the 95th percentile male driver in a stand-up position on the personal watercraft of FIG. 1.
Figure 19C:
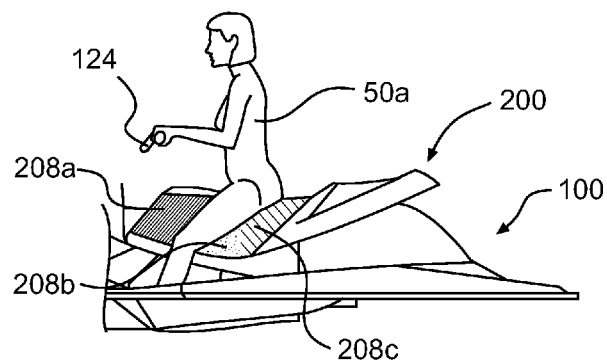
FIG. 19c is an illustration showing a left side elevation view of the 95th percentile male driver in a cruising position on the personal watercraft of FIG. 1.
Figure 19B:
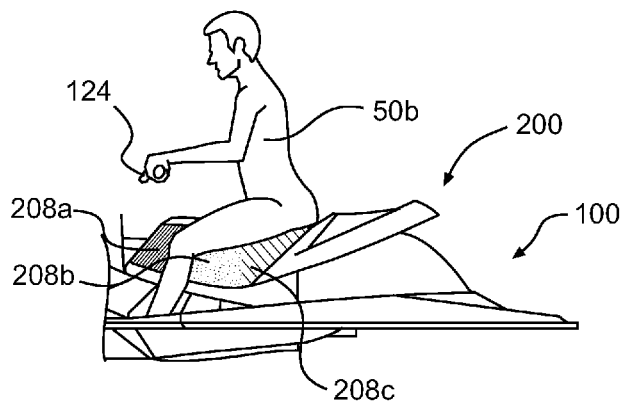
FIG. 19b is an illustration showing a left side elevation view of the 50th percentile male driver in a cruising position on the personal watercraft of FIG. 1.
Figure 19C:
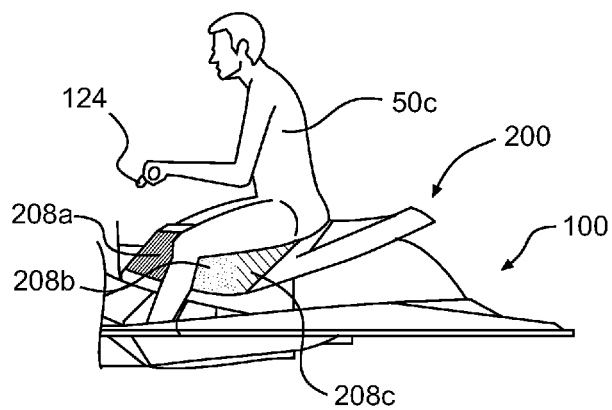
Figure 20A:
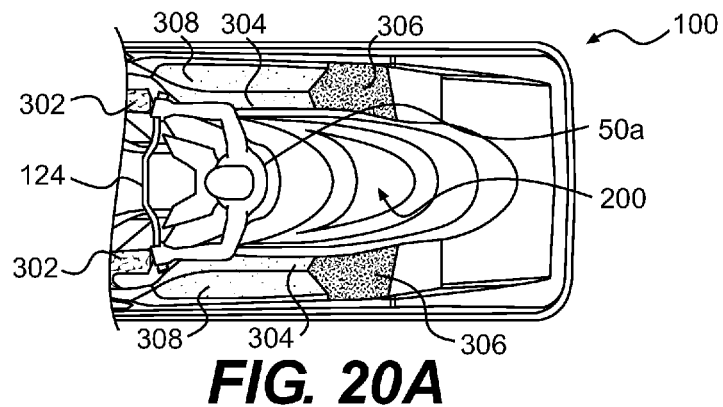
FIG. 20a is an illustration showing a top view of the 5th percentile female driver in a cruising position on the personal watercraft of FIG. 1.
Figure 20B:
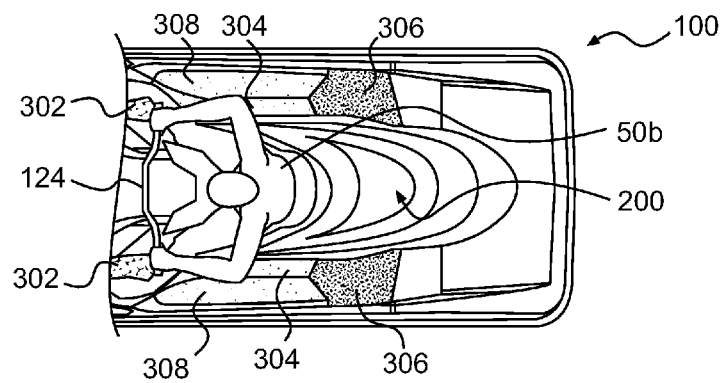
FIG. 20b is an illustration showing a top view of the 50th percentile male driver in a cruising position on the personal watercraft of FIG. 1.
Figure 20C:
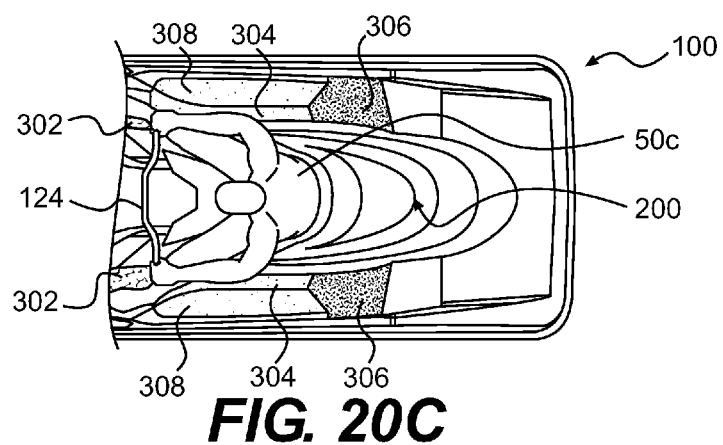
FIG. 20c is an illustration showing a top view of the 95th percentile male driver in a cruising position on the personal watercraft of FIG. 1.
Figure 21A:
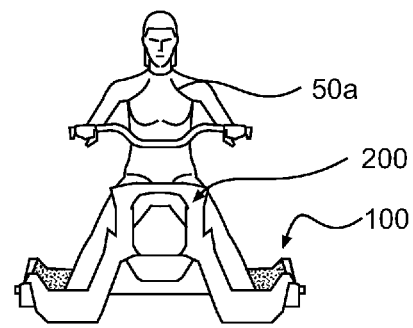
FIG. 21a is an illustration showing a front view of the 5th percentile female driver in a cruising position on the personal watercraft of FIG. 1.
Figure 21B:
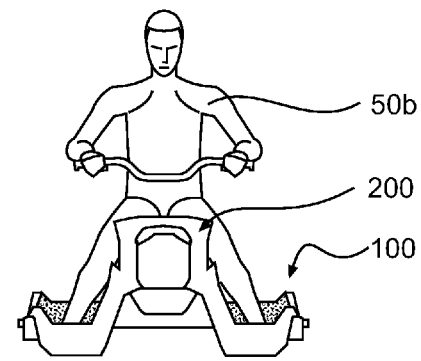
FIG. 21b is an illustration showing a front view of the 50th percentile male driver in a cruising position on the personal watercraft of FIG. 1.
Figure 21C:
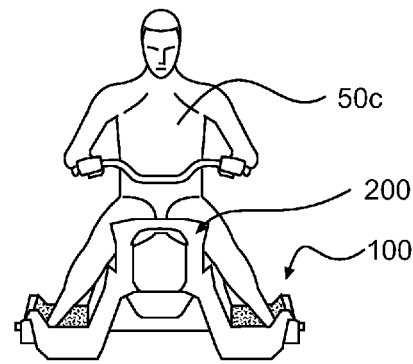
FIG. 21c is an illustration showing a front view of the 95th percentile male driver in a cruising position on the personal watercraft of FIG. 1.
Figure 22A:
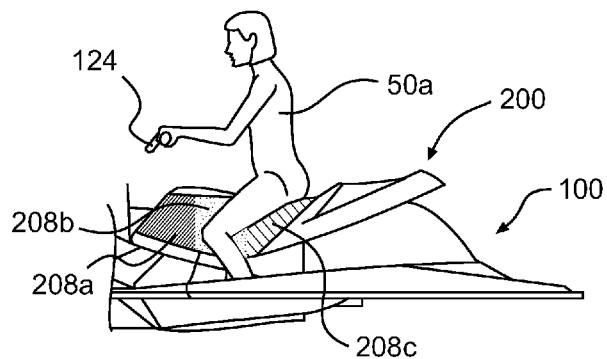
FIG. 22a is an illustration showing a left side elevation view of the 5th percentile female driver in a racing position on the personal watercraft of FIG. 1.
Figure 22B:
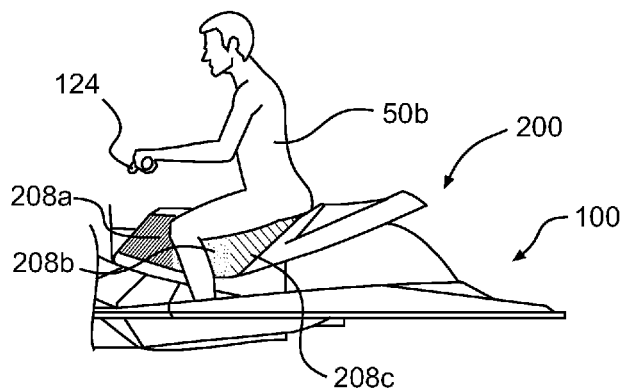
FIG. 22b is an illustration showing a left side elevation view of the 50th percentile male driver in a racing position on the personal watercraft of FIG. 1.
Figure 22C:
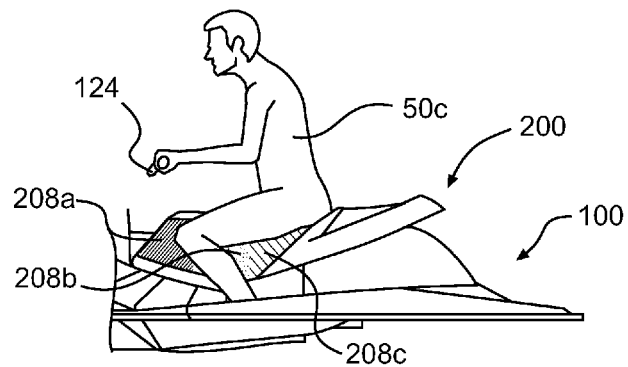
FIG. 22c is an illustration showing a left side elevation view of the 95th percentile male driver in a racing position on the personal watercraft of FIG. 1.
Figure 23A:
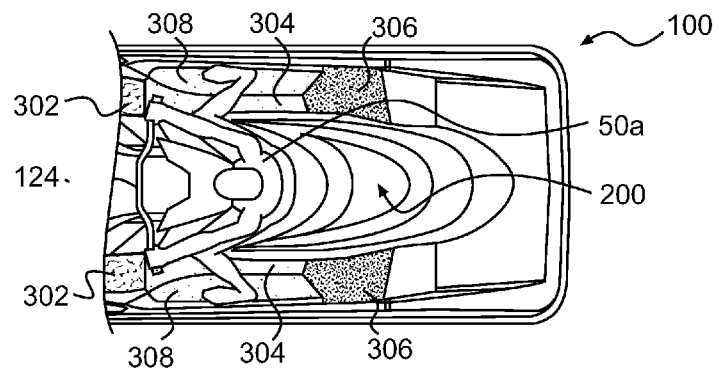
FIG. 23a is an illustration showing a top view of the 5th percentile female driver in a racing position on the personal watercraft of FIG. 1.
Figure 23B:
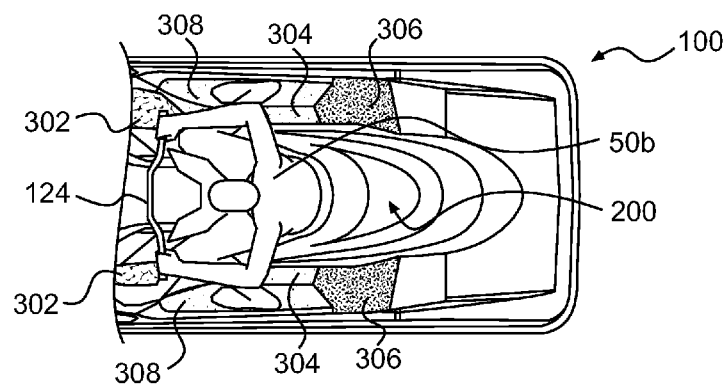
FIG. 23b is an illustration showing a top view of the 50th percentile male driver in a racing position on the personal watercraft of FIG. 1.
Figure 23C:
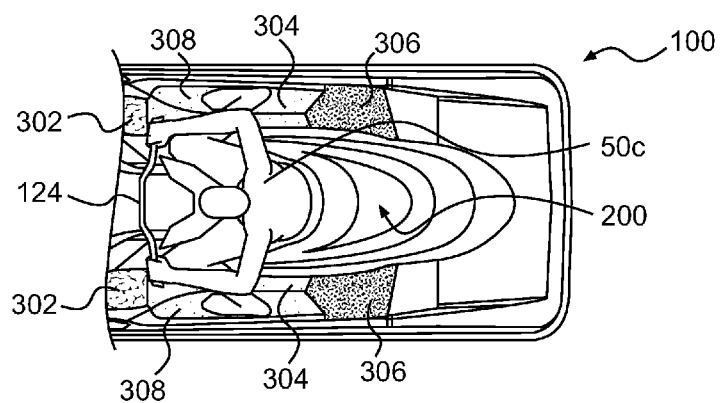
FIG. 23c is an illustration showing a top view of the 95th percentile male driver in a racing position on the personal watercraft of FIG. 1.
Figure 24A:
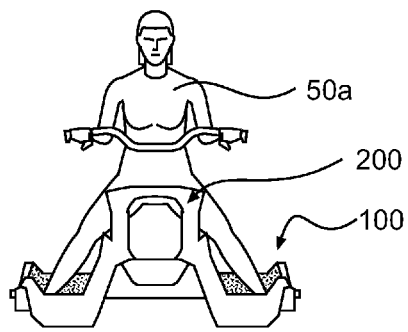
FIG. 24a is an illustration showing a front view of the 5th percentile female driver in a racing position on the personal watercraft of FIG. 1.
Figure 24B:
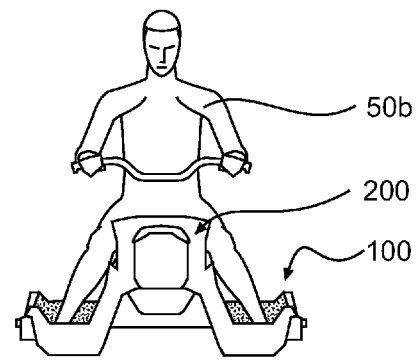
FIG. 24b is an illustration showing a front view of the 50th percentile male driver in a racing position on the personal watercraft of FIG. 1.
Figure 24C:
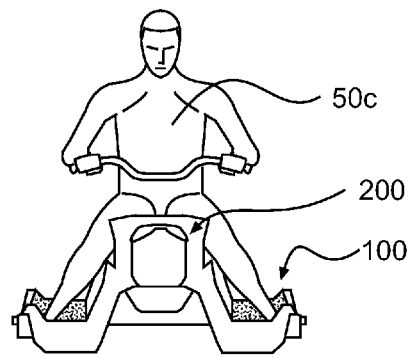
FIG. 24c is an illustration showing a front view of the 95th percentile male driver in a racing position on the personal watercraft of FIG. 1.

Turning now to FIGS. 14 and 15, dimensions of three drivers 50a, 50b and 50c (shown in FIGS. 16 to 24 labeled with 'A', 16 to 24 labeled with 'B', and 16 to 24 labeled with 'C' respectively) will be described.

The driver 50a is a 5th percentile U.S. female between 18 and 64 years old. She has a standing height D1 of 1520 mm and a weight of 50 kg. A sitting height D2 is 763 mm. A seated buttock to front of knee distance D3 is 540 mm. A sitting buttock to back of knee distance D4 is 439 mm. A sitting top of knee height D5 is 458 mm. A sitting back of knee height D6 is 370 mm. A calf height at maximum rearward protrusion D7 is 277 mm. A foot length D8 is 220 mm. A foot breadth D9 is 85 mm. A thigh circumference just below buttock D10 is 527 mm. A thigh circumference at the midpoint D11 is 431 mm. A knee circumference D12 is 331 mm. A calf circumference D13 is 323 mm.

The driver 50b is a 50th percentile U.S. male between 18 and 64 years old. He has the standing height D1 of 1769 mm and a weight of 85 kg. The sitting height D2 is 928 mm. The seated buttock to front of knee distance D3 is 626 mm. The sitting buttock to back of knee distance D4 is 511 mm. The sitting top of knee height D5 is 549 mm. The sitting back of knee height D6 is 458 mm. The calf height at maximum rearward protrusion D7 is 355 mm. The foot length D8 is 266 mm. The foot breadth D9 is 102 mm. The thigh circumference just below buttock D10 is 1604 mm. The thigh circumference at midpoint D11 is 537 mm. The knee circumference D12 is 366 mm. The calf circumference D13 is 392 mm.

The driver 50c is a 95th percentile U.S. male between 18 and 64 years old. He has the standing height D1 of 1893 mm and a weight of 120 kg. The sitting height D2 is 996 mm. The seated buttock to front of knee distance D3 is 688 mm. The sitting buttock to back of knee distance D4 is 567 mm. The sitting top of knee height D5 is 598 mm. The sitting back of knee height D6 is 507 mm. The calf height at max rearward protrusion D7 is 404 mm. The foot length D8 is 290 mm. The foot breadth D9 is 111 mm. The thigh circumference just below buttock D10 is 712 mm. The thigh circumference at midpoint D11 is 635 mm, the knee circumference D12 is 418 mm. The calf circumference D13 is 466 mm.

Turning now to FIGS. 16A to 24C, three typical positions of the drivers 50a, 50b and 50c on the straddle seat 200 and footrests 300 will be described. These positions will be described when the driver is in a straight forward driving direction. It is contemplated that the driver would change his/her body position when turning, such as when operating the watercraft 100 at high speed. In such cases the driver could have his/her right foot and leg positioned differently from his/her left foot and leg.

The three typical positions are: stand-up for acceleration, cruising and racing. The stand-up position is when the driver is standing on the watercraft 100, with legs on each side of the straddle seat 200 (as shown in FIGS. 16A to 18C). The cruising position is a straddling position where the driver sits without actively gripping his/her legs on the straddle seat 200 (as shown in FIGS. 19A to 21C). The racing position is a position where the driver straddles the straddle seat 200 and actively grips sides of the straddle seat 200 to help maneuver of the watercraft 100 such as would happen in a race or in a severe turning maneuver (as shown in FIGS. 22A to 24C).

With reference to FIGS. 16A to 18C, the stand-up position is characterized by the driver having his/her buttock lifted off the straddle seat 200 (seen in FIG. 16a for the driver 50a, in FIG. 16b for the driver 50b and in FIG. 16c for the driver 50c), and his/her torso leaning forward toward the steering handle 124. The driver positions his/her buttock rearward of his/her knees, and his/her feet rearward of his/her buttock. In addition, front views of the driver 50b (FIG. 18B), and the driver 50c (FIG. 18C) show that the tall drivers (50b, 50c) grip their knees and a part of their thighs and calves against rear side portions 208c of the straddle seat 200. To do so, they need to position their knees inward of their feet. Smaller drivers, such as driver 50a, grip almost the whole surface of their legs onto the straddle seat 200 and do not need to position their knees purposively inwards of their feet like taller drivers do. Drivers use the U-shaped line U to instinctively find their knee and thighs position on the straddle seat 200 and feet position on the footrests 300. The driver in the stand-up position abuts his/her feet against the rear portions 306 of the footrests 300 (seen in FIG. 17A for the driver 50a, in FIG. 17B for the driver 50b and in FIG. 17C for the driver 50c).

With reference to FIGS. 19A to 21C, the cruising position is characterized by the driver having his/her buttock seated on the top portion 206 of the straddle seat 200, but unlike in the stand-up position, the driver positions his/her buttock rearward of his/her knees, and his/her feet forward of his/her knees. It can be noted that smaller drivers such as the driver 50a seat completely on the front portion 210 of the top section 206. Medium sized drivers, such as the driver 50b, seat partially on the front portion 210 and partially on the rear portion 212. Tall drivers such as driver 50c seat mostly on the rear portion 212. The driver abuts his/her knees under the pair of wings 216 on the front side portions 208a of the two side portions 208. Smaller drivers, such as driver 50a, abut their knees against the central side portions 208b under the rear wing portions 219, while taller drivers, such as driver 50c, abut their knees against the front side portions 20a under the front wing portions 217. Medium sized drivers, such as the driver 50b, abut their knees partly against the front side portions 208a and partly against the central side portions 208b. A lower portion of the driver's thighs is also located under the pair of wings 216 at the central side portion 208b. It can be noted that smaller drivers, such as the driver 50a, have most of their thighs abutting the central side portions 208b, while tall drivers, such as driver 50c, have only part of their thighs against the central side portions 208b. The driver abuts his/her feet against the front portions 302 of the pair of footrests 300 (seen in FIG. 20a for the driver 50a, in FIG. 20b for the driver 50b and in FIG. 20c for the driver 50c). Front views (FIGS. 19A to 19C) show that smaller drivers, such as the driver 50a, have their feet close to the straddle seat 200 and therefore their calves abutting the two side portions 208, while tall drivers, such as driver 50c, have their feet away from the straddle seat 200 and their calves mostly not abutting the two side portions 208.

In the racing position, the driver straddles similarly to the cruising position (seen in FIGS. 22A to 24C), except that he/she has his/her feet forward of his/her buttocks and his/her knees forward of his/her feet. In addition, the driver positions his/her feet on the pad 308 of the middle section 304 of the pair of footrests 300 (seen in FIG. 23A for the driver 50a, in FIG. 23B for the driver 50b and in FIG. 23C for the driver 50c) instead of the front portion 302. It is contemplated that during turning for example, the driver could place one or two feet on the middle section 304 not comprising the pad 308.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A straddle seat for a vehicle comprising:
    a seat section having:
        a top portion having a rear portion and a front portion, the front portion of the top portion extending upwardly and forwardly from the rear portion, the front portion of the top portion having a generally hourglass shape, the hourglass shape having a narrowing, the front portion of the top portion having a pair of lateral wings; and
        two side portions downwardly extending from the top portion, the pair of lateral wings extending laterally outwardly above at least part of the two side portions, the pair of lateral wings being adapted to cover at least in part knees and thighs of a rider.

2. The straddle seat of claim 1, wherein the pair of lateral wings and the two side portions have front portions, the front portions of the two side portions being located underneath the front portions of the pair of lateral wings, the front portions of the two side portions being concave; and
    the front portions of the pair of lateral wings extend laterally outwardly beyond the front portions of the two side portions.

3. The straddle seat of claim 1, wherein the two side portions have central portions, the central portions of the two side portions extending generally outwardly from the central section; and the pair of lateral wings have rear portions, the central portions of the two side portions being located underneath the rear portions of the pair of lateral wings, the rear portions of the lateral wings extending partially laterally outwardly above the central portions of the two side portions.

4. The straddle seat of claim 1, wherein the two side portions have rear portions, the rear portions of the two side portions being located rearwardly of the pair of lateral wings; and
    the rear portions of the two side portions extend outwardly from the central section.

5. The straddle seat of claim 1, wherein the rear portion of the top portion extends generally upwardly and rearwardly from the front portion of the top portion.

6. The straddle seat of claim 1, wherein the seat section is a front seat section; and
    further comprising a rear seat section extending upwardly and rearwardly from the rear portion of the top portion of the front seat section.

7. The straddle seat of claim 1, wherein the front portion of the top section is generally planar.

8. The straddle seat of claim 1, wherein the front portion has a top front portion profile, the top front portion profile being smooth
    the rear portion has a top rear portion profile, the top rear portion profile being smooth; and
    wherein the top front portion profile is continuous with the top rear portion profile.

9. The straddle seat of claim 1, wherein a width between forwardmost points of the front portion of the top portion is larger than a width between forwardmost points of the two side portions.

10. The straddle seat of claim 1, wherein a horizontal longitudinal distance between an outwardmost point of the front portion of the top portion and the narrowing is smaller than a horizontal longitudinal distance between a forwardmost point of the two side portions and the narrowing.

11. A vehicle comprising:
    a steering assembly;
    a frame having an upper portion;
    a drive assembly supported by the frame;
    a straddle seat disposed on the upper portion of the frame and at least in part rearwardly of the steering assembly, the straddle seat having a seat section having a top portion having a rear portion and a front portion, the front portion extending upwardly and forwardly from the rear portion, the front portion having a generally hourglass shape, the hourglass shape having a narrowing, the seat section having two side portions downwardly extending from the top portion, the front portion of the top portion having a pair of lateral wings extending laterally outwardly above at least part of the two side portions for covering at least in part knees and thighs of a rider.

12. A personal watercraft comprising:
    a hull;
    a deck disposed above the hull;
    an engine disposed at least in part in the hull;
    a propulsion system connected to the hull and operatively connected to the engine;
    a helm assembly disposed on the deck;
    a straddle seat disposed on the deck at least in part rearwardly of the helm assembly, the straddle seat having a seat section having a top portion, the top portion having a rear portion and a front portion, the seat section having two side portions downwardly extending from the top portion, the front portion of the top portion extending upwardly and forwardly from the rear portion, the front portion having a generally hourglass shape, the hourglass shape having a narrowing, the front portion of the top portion having a pair of lateral wings extending laterally outwardly above at least part of the two side portions for covering at least in part knees and thighs of a rider; and a footrest disposed on each side of the straddle seat, each footrest having:

a middle section disposed rearwardly of the helm assembly;

a front section extending upwardly and forwardly from the middle section, the front section forming a first angle with the middle section, the front section extending at least in part forwardly of the helm assembly; and a rear section extending upwardly and rearwardly from the middle section, the rear section forming a second angle with the middle section, the rear section being in communication with a rear of the deck, the first angle being greater than the second angle.

13. The personal watercraft of claim 12, wherein the pair of lateral wings and the two side portions of the straddle seat have front portions, the front portions of the two side portions being located underneath the front portions of the pair of lateral wings, the front portions of the two side portions being concave.

14. The personal watercraft of claim 12, wherein the rear portion of the top portion of the straddle seat extends upwardly and rearwardly from the front portion of the top portion.

15. The personal watercraft of claim 12, wherein the seat section is a front seat section; and wherein the straddle seat further comprises a rear seat section extending upwardly and rearwardly from the rear portion of the top portion of the front seat section, the rear seat section being adapted to seat at least one passenger.

16. The personal watercraft of claim 12, wherein the middle section of each footrest further comprises a pad covering an outward portion of the middle section, the pad extending outwardly and upwardly from the middle section.

17. The personal watercraft of claim 12, further comprising a pedestal disposed on the deck at least in part rearwardly of the helm assembly, the pedestal supporting the straddle seat; and wherein the rear section of each footrest extends upwardly and outwardly from the pedestal.

18. The personal watercraft of claim 12, wherein the first angle is about 37 degrees.

19. The personal watercraft of claim 12, wherein the second angle is about 18 degrees.

* * * * *